US011463366B1

(12) United States Patent
Burnett et al.

(10) Patent No.: US 11,463,366 B1
(45) Date of Patent: Oct. 4, 2022

(54) AUTONOMOUS NETWORK OPTIMIZATION USING NETWORK TEMPLATES

(71) Applicant: Architecture Technology Corporation, Minneapolis, MN (US)

(72) Inventors: Benjamin L. Burnett, Prior Lake, MN (US); Deborah K. Charan, Minneapolis, MN (US); Ian J. McLinden, Minneapolis, MN (US); Jordan C. Bonney, Bloomington, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 59 days.

(21) Appl. No.: 17/028,664

(22) Filed: Sep. 22, 2020

(51) Int. Cl.
*H04L 47/2441* (2022.01)
*H04L 47/762* (2022.01)
*H04L 41/084* (2022.01)
*H04L 41/0816* (2022.01)
*H04L 41/08* (2022.01)
*H04L 47/78* (2022.01)
*H04W 16/28* (2009.01)
*H04B 7/06* (2006.01)
*H04W 76/19* (2018.01)
(Continued)

(52) U.S. Cl.
CPC ....... *H04L 47/2441* (2013.01); *H04B 7/0617* (2013.01); *H04L 41/0816* (2013.01); *H04L 41/0843* (2013.01); *H04L 41/0886* (2013.01); *H04L 47/762* (2013.01); *H04L 47/781* (2013.01); *H04W 16/28* (2013.01); *H04W 76/19* (2018.02); *H04L 45/02* (2013.01); *H04W 8/04* (2013.01)

(58) Field of Classification Search
CPC .............. H04B 7/0617; H04L 41/0816; H04L 41/0843; H04L 41/0886; H04L 45/02; H04L 47/2441; H04L 47/14; H04L 47/762; H04L 47/781; H04W 16/28; H04W 76/19
See application file for complete search history.

(56) References Cited

U.S. PATENT DOCUMENTS 6,625,118 B1   9/2003   Hadi Salim et al.
7,111,072 B1   9/2006   Matthews et al.
(Continued)

FOREIGN PATENT DOCUMENTS

WO   2014077905   5/2014

OTHER PUBLICATIONS

"High Assurance Internet Protocol Encryptor Interoperability Specification," National Security Agency, Version 3.1.2, Feb. 29, 2008, 35 pp.
(Continued)

*Primary Examiner* — George C Neurauter, Jr.
(74) *Attorney, Agent, or Firm* — Shumaker & Sieffert, P.A.

(57) ABSTRACT

This disclosure is directed to network optimization in a complex joint network for increasing the network utility of the complex joint network. A computing device in the complex joint network may receive a data flow via a complex joint network. The computing device may determine, based on a network template, a mission utility associated with the data flow and a traffic class associated with the data flow. The computing device may control one or more quality of service decisions based at least in part on the mission utility associated with the data flow and the traffic class associated with the data flow.

23 Claims, 19 Drawing Sheets

(51) Int. Cl.
*H04L 45/02* (2022.01)
*H04W 8/04* (2009.01)

(56) References Cited

U.S. PATENT DOCUMENTS

| | | | |
|---|---|---|---|
| 7,225,271 B1* | 5/2007 | DiBiasio | H04L 47/10 709/224 |
| 7,496,661 B1* | 2/2009 | Morford | H04L 41/5025 709/224 |
| 7,995,475 B2 | 8/2011 | Ramanujan et al. | |
| 8,022,885 B2* | 9/2011 | Smoyer | H01Q 1/125 343/763 |
| 8,311,049 B2* | 11/2012 | Roberts | H04L 47/10 370/412 |
| 8,874,719 B1 | 10/2014 | Burnett et al. | |
| 9,160,553 B2 | 10/2015 | Wu et al. | |
| 9,191,377 B2 | 11/2015 | Charan et al. | |
| 9,225,637 B2 | 12/2015 | Ramanujan et al. | |
| 9,407,565 B1 | 8/2016 | Li et al. | |
| 9,602,296 B2 | 3/2017 | Wu et al. | |
| 9,736,112 B2 | 8/2017 | Burnett et al. | |
| 9,887,974 B2 | 2/2018 | Charan et al. | |
| 10,225,138 B2 | 3/2019 | Wu et al. | |
| 10,250,388 B2 | 4/2019 | Sanders et al. | |
| 10,454,891 B2 | 10/2019 | Burnett et al. | |
| 10,574,528 B2* | 2/2020 | Mayya | H04L 41/0896 |
| 10,587,509 B2 | 3/2020 | Ramanujan et al. | |
| 10,659,476 B2 | 5/2020 | Ramanujan et al. | |
| 2002/0097724 A1 | 7/2002 | Halme et al. | |
| 2005/0015493 A1* | 1/2005 | Anschutz | H04L 41/0896 709/226 |
| 2006/0182039 A1 | 8/2006 | Jourdain et al. | |
| 2006/0221974 A1 | 10/2006 | Hilla et al. | |
| 2007/0121615 A1 | 5/2007 | Weill et al. | |
| 2007/0265875 A1 | 11/2007 | Jiang et al. | |
| 2007/0280245 A1* | 12/2007 | Rosberg | H04L 47/10 370/392 |
| 2008/0162929 A1 | 7/2008 | Ishikawa et al. | |
| 2008/0262990 A1 | 10/2008 | Kapoor et al. | |
| 2008/0276001 A1 | 11/2008 | Menon | |
| 2008/0279181 A1 | 11/2008 | Shake et al. | |
| 2010/0091650 A1 | 4/2010 | Brewer, Jr. et al. | |
| 2010/0142524 A1* | 6/2010 | Garofalo | H04L 47/12 370/389 |
| 2010/0208609 A1* | 8/2010 | Sundarraman | H04W 28/02 370/252 |
| 2010/0226250 A1 | 9/2010 | Plamondon | |
| 2011/0099631 A1 | 4/2011 | Willebeek-LeMair et al. | |
| 2011/0131646 A1 | 6/2011 | Park et al. | |
| 2011/0159880 A1* | 6/2011 | Kumar | H04W 76/19 455/450 |
| 2011/0214157 A1 | 9/2011 | Korsunsky et al. | |
| 2011/0238855 A1 | 9/2011 | Korsunsky et al. | |
| 2011/0242978 A1* | 10/2011 | Klein | H04L 47/24 370/235 |
| 2012/0039337 A1 | 2/2012 | Jackowski et al. | |
| 2012/0057478 A1* | 3/2012 | Brannstrom | H04W 28/10 370/252 |
| 2012/0060029 A1 | 3/2012 | Fluhrer et al. | |
| 2012/0078994 A1 | 3/2012 | Jackowski et al. | |
| 2012/0117646 A1 | 5/2012 | Yoon et al. | |
| 2012/0170744 A1 | 7/2012 | Cheng | |
| 2012/0230345 A1 | 9/2012 | Ovsiannikov | |
| 2012/0240185 A1 | 9/2012 | Kapoor et al. | |
| 2013/0021909 A1* | 1/2013 | Bader | H04L 47/724 370/237 |
| 2013/0077486 A1 | 3/2013 | Keith | |
| 2013/0182573 A1* | 7/2013 | Soppera | H04L 69/163 370/235 |
| 2013/0322436 A1 | 12/2013 | Wijnands et al. | |
| 2014/0056307 A1 | 2/2014 | Hutchison et al. | |
| 2014/0226475 A1* | 8/2014 | Stewart | H04L 47/20 370/230.1 |
| 2015/0029862 A1 | 1/2015 | Olenz et al. | |
| 2015/0103672 A1* | 4/2015 | Stuart | H04L 45/02 370/241 |
| 2015/0358287 A1 | 12/2015 | Caputo, II et al. | |
| 2016/0057116 A1 | 2/2016 | Charan et al. | |
| 2016/0099865 A1 | 4/2016 | Klincewicz et al. | |
| 2016/0150459 A1 | 5/2016 | Patil et al. | |
| 2016/0157284 A1* | 6/2016 | Kim | H04W 4/023 370/329 |
| 2016/0226758 A1 | 8/2016 | Ashwood-Smith | |
| 2016/0294865 A1 | 10/2016 | Wei et al. | |
| 2016/0301618 A1 | 10/2016 | Labonte et al. | |
| 2016/0330236 A1 | 11/2016 | Reddy et al. | |
| 2017/0171158 A1 | 6/2017 | Hoy et al. | |
| 2017/0230269 A1* | 8/2017 | Kamath | H04L 41/0816 |
| 2017/0359448 A1 | 12/2017 | Sung et al. | |
| 2018/0077171 A1* | 3/2018 | Ramanujan | H04L 63/1483 |
| 2018/0083866 A1* | 3/2018 | Gobriel | H04L 45/02 |
| 2018/0248714 A1 | 8/2018 | Milescu et al. | |
| 2020/0084683 A1* | 3/2020 | Moosavi | H04W 36/24 |

OTHER PUBLICATIONS

"High Assurance Internet Protocol Encryptor," Wikipedia, the free encyclopedia, retrieved from https://en.wikipedia.org/wiki/High_Assurance_Internet_Protocol_Encryptor, Dec. 5, 2016, 3 pp.

"National Policy Governing the Use of High Assurance Internet Protocol Encryptor (HAIPE) Products," Committee on National Security Systems, CNSS Policy No. 19, Feb. 2007, 8 pp.

Fasolo, "Network coding techniques," Wireless Systems—Lecture, Mar. 7, 2004, 27 pp.

Kaddoura et al., IQSM: An End-to-end IntServ QoS Signaling Mechanism for Crypto-partitioned Networks, MILCOM 2009, Oct. 2009, 5 pp.

Ni et al., "Routing with opportunistically coded exchanges in wireless mesh networks," Wireless Mesh Networks, WiMesh, Sep. 2006, 3 pp.

Yeung et al., "Network Coding Theory," Foundation and Trends in Communications and Information Theory, vol. 2, No. 4 and 5, 2005, 154 pp. (Applicant points out, in accordance with MPEP 609.04(a), that the year of publication, 2005, is sufficiently earlier than the effective U.S. filing date, so that the particular month of publication is not in issue.).

U.S. Appl. No. 16/856,843, naming inventors: Ramanujan et al., filed Apr. 23, 2020.

Prosecution History from U.S. Appl. No. 15/262,979, dated Apr. 24, 2018 throughJan. 10, 2020, 454 pp.

Notice of Allowance from U.S. Appl. No. 16/856,843, dated Jan. 20, 2022, 39 pp.

Office Action from U.S. Appl. No. 16/856,843, dated Sep. 9, 2021, 70 pp.

Response to Office Action dated Sep. 9, 2021, from U.S. Appl. No. 16/856,843, filed Dec. 9, 2021, 17 pp.

* cited by examiner

AUTONOMOUS NETWORK OPTIMIZATION USING NETWORK TEMPLATES

STATEMENT REGARDING FEDERALLY-SPONSORED RESEARCH OR DEVELOPMENT

This invention was made with government support under Contract No. FA8750-18-C-0124 awarded by the U.S. Air Force. The government has certain rights in this invention.

TECHNICAL FIELD

The disclosure relates to monitoring statuses of a wide-area network.

BACKGROUND

A complex joint network is a wide-area network (WAN) made up of subnetworks and other communication networks, and may be used to transfer data flows and other data packets across the complex joint network between different internal networks or segments of internal networks. Such internal networks may include local area networks (LANs) and/or trusted enclaves. Routers at the border of the complex joint network and the different internal networks may control the admission of data flows between the complex joint network and the internal networks based on factors such as the quality of service settings for the router.

SUMMARY

This disclosure is directed to using a network template to coordinate the settings of nodes, such as routers, throughout a complex joint network, including coordinating the tracking of data flows, network quality of service control such as data flow admission control, as well as visualization of data flows across the complex joint network to improve the network utility of the complex joint network. Specifically, the network template may be used by nodes of the complex joint network to make real-time quality of service decisions to prioritize data flows, such as dynamic flow admission control of data flows, based on dynamic utility and quality priority metadata provided by the network template.

Administrators of the complex joint network may use the network templates to manage and visualize the data flows across the network and may use the network template to configure nodes across the complex joint network to optimize the cumulative network performance and the mission utility of the complex joint network. A network management system may, based on the performance of the complex joint network and information received from nodes of the complex joint network, perform network optimization by sending commands to the nodes of the complex joint network to change the operations of the nodes to increase the network utility of the complex joint network 4.

In one example, the disclosure describes a method. The method includes receiving, by a computing device, a data flow via a complex joint network. The method further includes determining, by the computing device and based on a network template, a mission utility associated with the data flow and a traffic class associated with the data flow. The method further includes controlling, by the computing device, one or more quality of service decisions based at least in part on the mission utility associated with the data flow and the traffic class associated with the data flow.

In another example, the disclosure describes a computing device. The computing device includes memory. The computing device further includes one or more processors operably coupled to the memory and configured to: receive a data flow via a complex joint network; determine, based on a network template, a mission utility associated with the data flow and a traffic class associated with the data flow; and control one or more quality of service decisions of the data flow based at least in part on the mission utility associated with the data flow and the traffic class associated with the data flow.

In another example, the disclosure describes a computer-readable medium storing instructions that, when executed, cause one or more processors of a computing device to receive a data flow via a complex joint network, determine, based on a network template, a mission utility associated with the data flow and a traffic class associated with the data flow, and control one or more quality of service decisions based at least in part on the mission utility associated with the data flow and the traffic class associated with the data flow.

Accompanying drawings and the description below. Other features, objects, and advantages of the disclosure will be apparent from the description and drawings, and from the claims.

DETAILED DESCRIPTION

Figure 1A:
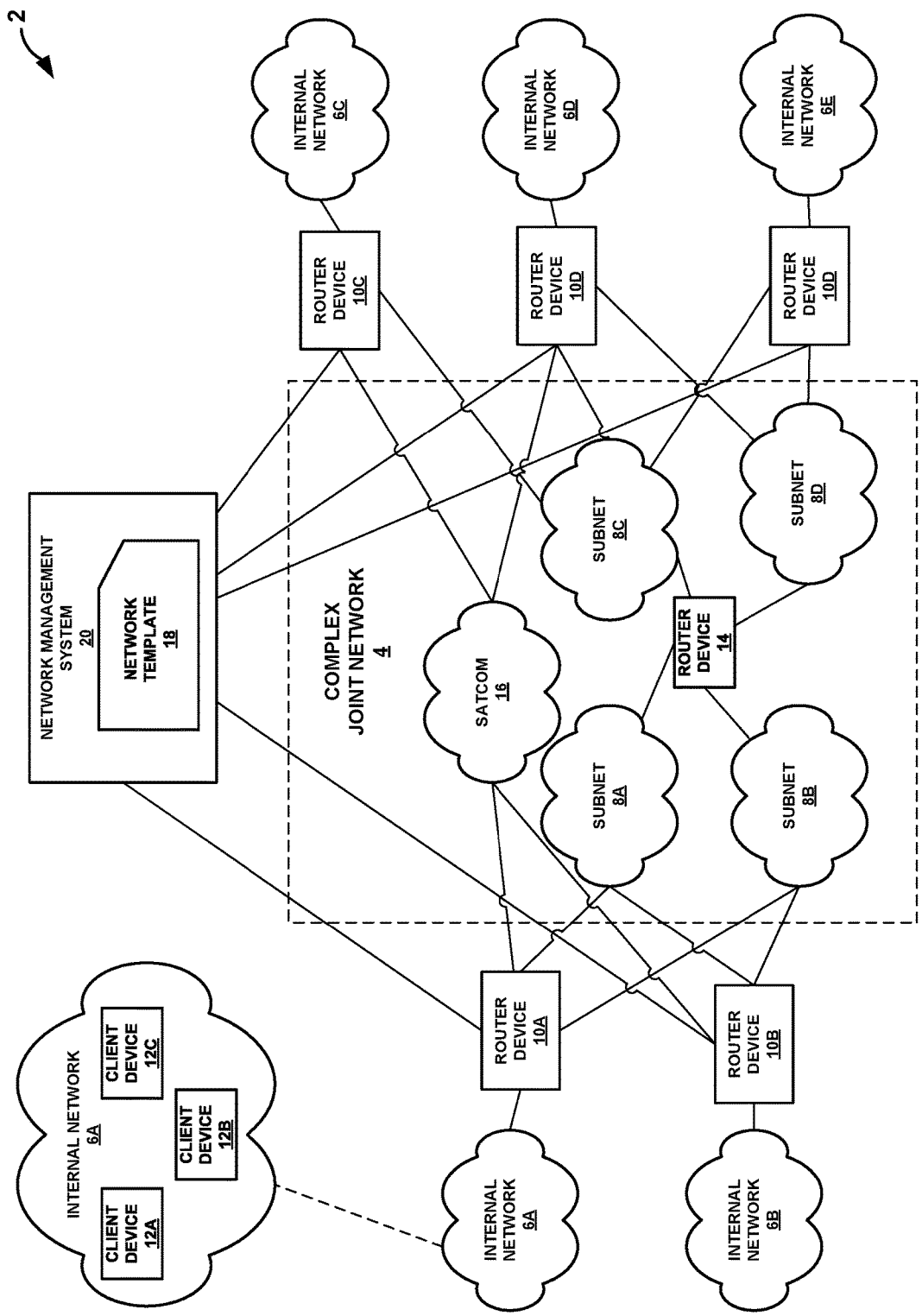
FIGS. 1A and 1B are block diagrams illustrating example systems for performing flow admission control in accordance with aspects of this disclosure.

In general, this disclosure is directed to techniques and systems that may increase the network utility of a computer network through autonomous network and mission optimization. Specifically, the techniques of this disclosure include the use of a network template that includes network-wide quality of service settings to configure nodes within the network and to enable nodes of the network to perform flow admission control of data flows in ways that increases the amount of data flows admitted by nodes of the network.

A complex joint network may be a network made up of nodes and a variety of different types of subnetworks across a wide geographical area that are connected for transmitting data such as video data, audio data, textual data, Internet data traffic, and the like, in the form of data flows of associated network packets. An organization, such as a corporation, a military unit, or any other collection of users, may use the complex joint network to transmit data flows to perform one or more tasks to accomplish a mission, such as a military operation, using the complex joint network.

During the mission, users may use the complex joint network to send and receive data flows related to performing the mission. For example, users may send and receive such data flows to and from mission elements, which may be traffic flow endpoints such as users, devices, machines, servers, and the like, across the complex joint network. Nodes of the network. such as router devices. that perform routing of the data flows may receive data flows and may route the received data flows to their destinations in the network. To route the received data flows, router devices in the network may make real-time quality of service (QoS) decisions to perform flow admission control to determine whether to admit a received data flow for routing to the data flow's destination or to deny admission of a received data flow.

In some examples, a router device in the network may perform flow admission control based on mission utilities associated with data flows, where the mission utility associated with a data flow may correspond to the relative priority of the data flow. The router device may prioritize data flows associated with higher mission utilities over data flows with lower mission utilities to reduce possible delays, packet loss, and the like, in transmitting data flows associated with higher mission utilities.

However, a router device may not be able to determine the mission utilities associated with data flows due to several reasons. For example, in order to minimize the size of a data flow, network packets of a data flow may not indicate the mission utility associated with the data flow. In another example, the mission utility of a data flow may change over time during the mission based on several different factors, such that certain data flows may become relatively more important, and thus increase in its associated mission utility, or may become relatively less important, and thus decrease in its associated mission utility. A network having router devices that are not able to determine, in real-time, the mission utilities associated with data flows may not be able to maximize the Normalized Cumulative Network Performance (CNP) of the network or the network utility of the network, which may be the sum of the mission utilities of data flows admitted in the network divided by the sum of the mission utility associated with all requested data flows in the network.

In accordance with aspects of the present disclosure, nodes in a network may be able to make real-time quality of service (QoS) decisions based on a network template that includes various real-time information associated with the network, such as the flow types of data flows in the network, the mission elements in the network, the traffic classes of data flows in the network, and the like. The network template may be continuously updated with the latest information regarding the network. A router device in the network may utilize the network template to derive the mission utility associated with a data flow by determining, based on information contained in network packets of the data flow, information associated with the data flow, such as one or more flow types associated with the data flow and one or more source mission elements of the data flow. The router device may therefore determine the mission utility associated with the data flow based on such information associated with the data flow and perform flow admission control of data flows based on the derived mission utilities associated with the data flows.

The techniques of this disclosure may increase the performance of a computer network. By enabling router devices of the network to derive, in real-time, the current mission utilities of data flows received by the router device and to perform quality of service and/or network quality techniques, such as flow admission control of the data flows, based on the current mission utilities of data flows, the techniques of this disclosure thereby increases the network utility of the network by enabling router devices to increase the amount of higher priority data flows that are admitted by the router devices and to reduce possible delays, packet loss, and the like, in transmitting higher priority data flows in the network.

Figure 1B:
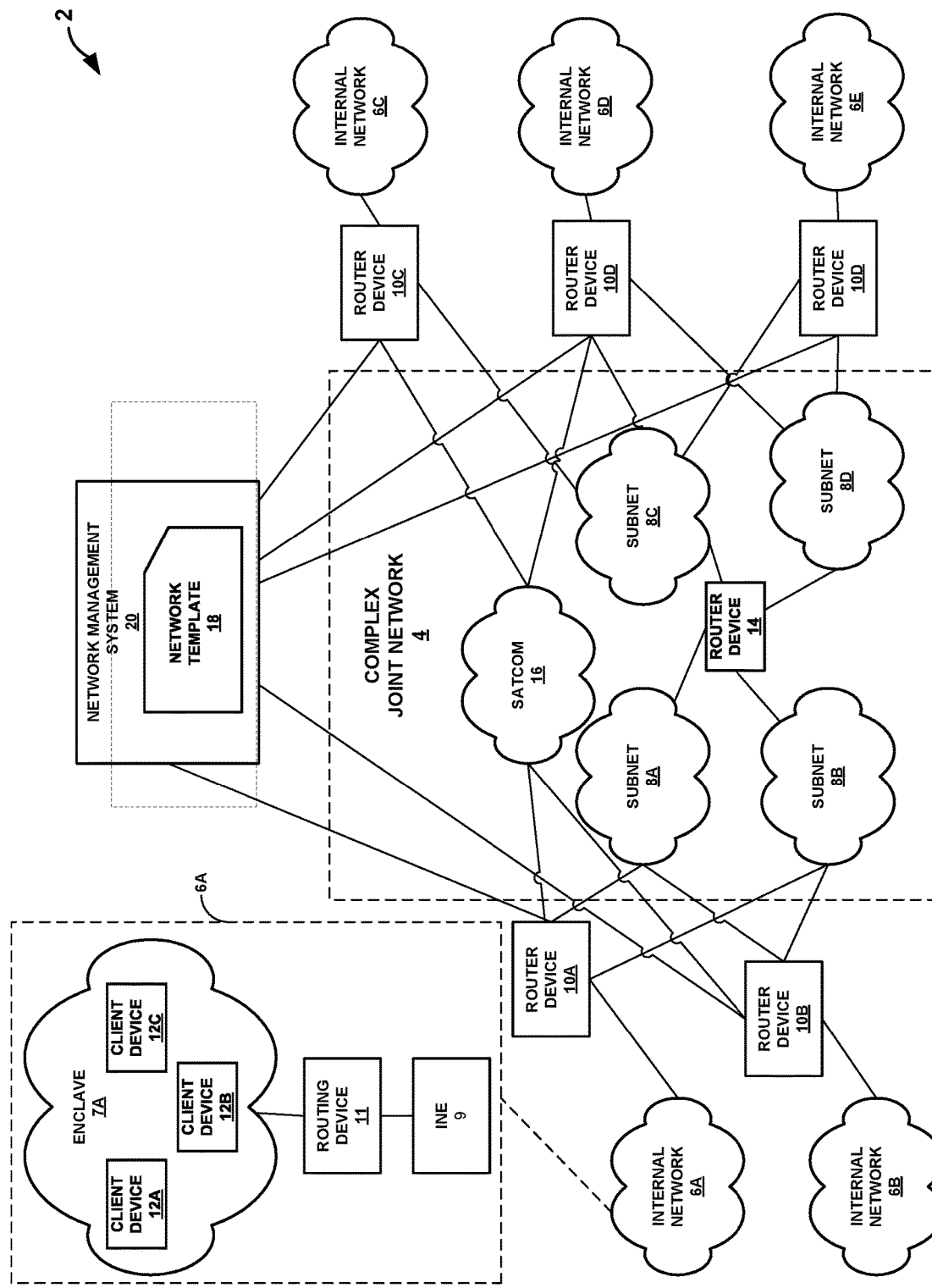

FIGS. 1A and 1B are block diagrams illustrating a system 2 for performing flow admission control in accordance with aspects of this disclosure. As shown in FIG. 1A, system 2 includes a plurality of internal networks 6A-6E (collectively "internal networks 6"), such as LANs or other internal networks, connected by complex joint network 4. While there could be other configurations, an example of a basic structure for system 2 is illustrated in FIGS. 1A and 1B.

Complex joint network 4 may be a wide area network (WAN) that includes a global scale network of interconnected subnets and routers. In the example of FIG. 1A, complex joint network 4 includes subnetworks 8A-8B (hereafter "subnets 8"), such as wired or wireless LANs, WANs (e.g., radio WANs), optical-based networks, satellite communication (SATCOM) networks, route radio networks, bridge radio networks, and the like that are interconnected via one or more router devices, such as router device 14. Subnets 8 may be based on or use Transmission Control Protocol/Internet Protocol (TCP/IP) or any other protocol that can be tunneled or wrapped over TCP/IP networks.

In addition, complex joint network may also include satellite communication (SATCOM) networks, such as SATCOM network 16, that is interconnected with subnets 8 via, e.g., router device 14. In other examples, complex joint network 4 may include any number of subnets connected via any number of routers as well as additional communication networks.

Each of internal networks 6 may include one or more client devices 12A-12C (collectively, "client devices 12"). Client devices 12 could be stationary computing devices, mobile computing devices, or any other suitable computing devices that send and receive data packets via router devices 10.

Each of internal networks 6 is connected to complex joint network 4 via respective router devices 10A-10E (collectively "router devices 10"). Router devices 10 may be network appliances that controls the forwarding of data packets between computer networks. For example, router devices 10 may control the forwarding of data packets between complex joint network 4 and internal networks 6. Further, router devices 10 may also control the forwarding of data packets between internal networks 6. For example, router devices 10 may be able to control the forwarding of data packets from a first subnet (e.g., subnetwork 8A) to a second subnet (e.g., subnetwork 8B), such as by selecting the network links in complex joint network 4 over which the data packets are forwarded from the first subnet to the second subnet.

Router devices 10 may connect to complex joint network 4 via links such as fiber optic links, SATCOM links, wireless radio links, and the like. For example, router device 10A may connect to SATCOM network 16 via a SATCOM link and may connect to subnet 8A via a fiber optic link.

System 2 may include network management system 20, which may be one or more computing devices, server devices, and the like that are connected to nodes in complex joint network 4, such as being connected to router devices 10. Network management system 20 may coordinate and manage the operations and settings of router devices 10. Network management system 20 may include network template 18 for coordinating the settings of router devices 10 throughout system 2. In some examples, router devices 10 may each store a copy of network template 18. In other examples, network template 18 may be stored in network management systems connected to router devices 10, such as network management system 20, or elsewhere (e.g., other servers) in system 2. When the network template 18 is edited, the edits made in network template 18 may be propagated across system 2, such as being propagated throughout router devices 10, complex joint network 4, router device 11 (shown in FIG. 1B), and the like, so that router devices 10 may operate using the latest version of network template 18.

As shown in FIG. 1B, internal networks 6 may, in some examples, be configured to receive encrypted data packets from complex joint network 4. For example, internal network 6 may include enclave 7A that includes client devices 12 that are connected to router device 11 to send and receive data packets to and from Inline Network Encryptor (INE) 9.

Inline Network Encryptor (INE) 9 is an encryption device that communicates with router device 10A to receive encrypted data packets from complex joint network 4. INE 9 may decrypt the received data packets and forward them to one of client devices 12 via router device 11. Similarly, INE 9 may receive plain-text (i.e., unencrypted) data packets from client devices 12 via router device 11, encrypt the data packets according to an encryption protocol, and send the data packets to another one of internal networks 6 via complex joint network 4.

In general, INE 9 fronting enclave 7A encrypts all IP traffic originating from that enclave and transports the IP traffic over secure Internet protocol security (IPsec) tunnels to the respective INEs fronting respective destination internal networks which decrypt these data packets before forwarding them to the hosts residing behind them. INE 9 is configured to prevent bypass of any data from a plain-text (PT) network interface to a cipher-text (CT) interface, except for multicast join messages and tags associated with data flows generated by router device 11, as described in more detail below. Examples of INE 9 include High Assurance IP Encryptors (HAIPEs) or commercial solutions for classified (CSfC) virtual private network (VPN) gateways.

Network management system 20 may use network template 18 to manage complex joint network 4 regardless of whether complex joint network 4 transports encrypted data packets or unencrypted data packets. Network template 18 may include one or more files that include information regarding naming conventions, subnets, links, flow types, quality of service (QoS) settings, and other types of information that can be used by router devices 10 as well as any other suitable router devices and systems in system 2, such as router device 14. For example, network template 18 may include information that can be used by a visualizer tool provided by network management system 20 in system 2 to auto-configure items and flows that can be tracked and displayed by the visualizer tool.

Network template 18 may also include information for configuring the data used by router devices 10 to perform dynamic flow admission control and make real-time QoS decisions throughout complex joint network 4. For example, network template 18 may define the types of flows that are identified and/or permitted throughout complex joint network 4 and may, for each identified flow, include information that can be used by router devices 10 to make real-time QoS decisions regarding flow admissions.

In accordance with aspects of the present disclosure, a router device such as router device 10A of router devices 10, router device 14, or router device 11 may perform flow admission control based on network template 18. Specifically, routing device 10A may receive a copy of network template 18 from network management system 20, such as at the start of a mission, and may, in response to receiving a data flow, determine whether to admit the traffic flow based on information associated with the data flow in network template 18. While this disclosure is described with respect to router device 10A and/or router device 11, the techniques of this disclosure can equally be performed by any router device in complex joint network 4, such as any of router devices 10, router device 14, router device 11, any routing devices in subnetwork 8, and the like.

A data flow may be a sequence of associated data packets that are transmitted from a source node in complex joint network 4 to a destination node in complex joint network 4. In some examples, router device 10A may receive a data flow from internal network 6A at an interface of router device 10A, and router device 10A may perform flow admission control to determine whether to perform routing functionality to transmit the data flow on a network link to route the data flow through complex joint network 4 to one of the other router devices 10 (e.g., one of router devices 10B-10E). In some examples, router device 10A may receive a control data flow from complex joint network 4 at an interface of router device 10A, and router device 10A may perform flow admission control to determine whether to perform routing functionality to transmit the data flow on a network link to route the data flow to one or more of client devices 12 in internal network 6A.

Router device 10A may divide the bandwidth of a network link amongst different traffic classes, such as traffic classes defined by network template 18, and may, for each of a plurality of traffic classes, reserve a specific amount of bandwidth of a network link for router device 10A to transmit data flows of the traffic class. As such, router device 10A may determine whether to admit a data flow of a specific traffic class based on whether there is sufficient available bandwidth in the bandwidth of the network link reserved for the specific traffic class to transmit the data flow via the network link.

Data flows within a traffic class are prioritized based on the mission utility associated with the data flows. That is, if there is insufficient available bandwidth in the bandwidth of the network link reserved for the specific traffic class to transmit an incoming data flow of the traffic class, router device 10A may drop (i.e., cease to receive and transmit) one or more data flows of the traffic class having lower mission utility than the mission utility of the data flow to create sufficient available bandwidth in the bandwidth of the network link reserved for the specific traffic class to transmit the data flow.

As such, router device 10A may, in response to receiving a data flow, determine a mission utility associated with the data flow and a traffic class associated with the data flow in order to control admission of the data flow based on the mission utility associated with the data flow and the traffic class associated with the data flow. To determine the mission utility associated with the data flow and the traffic class, associated with the data flow, router device 10A may inspect data packets of a data flow to determine various information and may use such information to determine the mission utility associated with the data flow and the traffic class associated with the data flow. The contents of a data packet of a data flow, such as the contents of the header of the data packet, may include any one or combination of the source network address and source port of the data packet, the destination network address and the destination port, the transport protocol identifier for the data packet, as well as other relevant information associated with the data packet.

In examples where router 10A receives encrypted data flow, such as in the example of FIG. 1B where router device 10A is on the encrypted side of INE 9, router device 10A may be unable to inspect the data packets of a data flow because the data packets are encrypted. For example, a data flow originating from one of client devices 12 may flow from enclave 7A to routing device 11 to INE 9, where INE 9 encrypts the data flow before the data flow reaches router device 10A.

In these examples, because router device 11 on the plaintext side of INE 9 may encounter data flows before the data flows are encrypted by INE 9, router device 11 may, in response to receiving a data flow, inspect the unencrypted data packets of the data flow prior to INE 9 encrypting the data flow and may generate a tag associated with a data flow. Specifically, router device 11 may inspect data packets of a data flow to determine various information and may generate a tag associated with the data flow that may include any one or combination of the source network address and source port of the data packet, the destination network address and the destination port, the transport protocol identifier for the data packet, as well as other relevant information associated with the data packet. Router device 11 may also determine, based on such information, the mission utility associated with the data flow and the traffic class associated with the data flow. Router device 11 may therefore generate, for a data flow, associated tags, the mission utility associated with the data flow, and the traffic class associated with the data flow.

In some examples, router device 11 may, upon generating the tag associated with a data flow and upon determining the mission utility and the traffic class associated with the data flow, transmit the tag, the mission utility, and the traffic class associated with the data flow, to router device 10A and to network management system 20. For example, router device 11 may transmit the tag associated with the data flow, the mission utility, and the traffic class associated with the data flow to network management system 20. In some examples, router device 11 may insert the tag, the mission utility, and the traffic class associated with the data flow in data packets of the data flow and forward the data packet to INE 9. When INE 9 receives the data packets, INE 9 may refrain from encrypting the portions of the data packets that contain the tag generated and determined by router device 11, the mission utility, and the traffic class associated with the data flow. Thus, when router device 10A receives the encrypted data flow from INE 9, the data packets of the encrypted data flow may each include an unencrypted portion that contains the tag, the mission utility, and the traffic class associated with the data flow generated an determined by router device 11.

Router device 10A may receive the tags generated by router device 11, either via INE 9 or via network management system 20. Router device 10A may, for a set of encrypted data flows received by router device 10A, receive a set of tags associated with the set of encrypted data flows. Router device 10A may split up the set of encrypted data flows into individual encrypted data flows, determine the tag associated with each of the individual encrypted data flows, and perform quality of service techniques for each of the individual encrypted data flows, such as flow admission control, based on the associated tags, as described in this disclosure.

Router device 10A or router device 11 may determine the traffic class associated with the data flow based on at least one of: the source port of the data flow or the destination port of the data flow. Examples of traffic classes may include a chat traffic class, a video traffic class, a VoIP traffic class, a bulk traffic class (e.g., for file transfer protocol data flows), a web traffic class, a control traffic class, and the like. Network template 18 may specify a plurality of traffic classes, where each traffic class in the plurality of traffic classes specifies one or more data flows of the traffic class. Specifically, each traffic class in the plurality of traffic classes may specify the one or more data flows of the traffic class by specifying one or more ports that are associated with the traffic class. Router device 10A or router device 11 may therefore determine a traffic class that is associated with the traffic flow out of the plurality of traffic classes specified by network template 18 as the traffic class that specifies a port that matches the source port of the data flow or the destination port of the data flow.

In some examples, network template 18 may also include a default traffic class. If router device 10A or router device 11 cannot match a data flow with one of the traffic classes specified by network template 18, router device 10A or router device 11 may determine that the data flow is an unmatched data flow that is associated with the default traffic class, and any remaining unallocated bandwidth of router device 10A may be used to admit such unmatched data flows. If router device 10A does not have any unallocated bandwidth or if the remaining unallocated bandwidth of router device 10A is less than an expected bandwidth used by the unmatched data flow, then router device 10A may refrain from admitting the unmatched data flow.

Network template 18 may, for each traffic class, also specify a default optimization basis (also referred to as "OptimizationBasis"). The optimization basis may be used by routers (e.g., router device 10A and router device 11) as well as network management system 20 to perform autonomous optimization of, e.g., complex joint network 4. The optimization basis for a traffic class may include 1) a throughput size or speed of the traffic class, 2) a response latency or jitter of the traffic class, 3) a stability (e.g., associated with a reduction of errors) of the traffic class, 4) and any other suitable information.

To determine the mission utility associated with the data flow, router device 10A or router device 11 may determine the flow type associated the data flow. In some examples, network template 18 may specify a plurality of flow types, where each flow type indicates a type of data flow associated with the flow type. Examples of flow types may include a voice over IP (VoIP) flow type, a world wide web (WWW) flow type, a chat flow type, and the like.

Network template 18 may, for each flow type in the list of flow types, specify at least a port, a bandwidth, and a flow type mission utility. The port may be a TCP or UDP port or range of TCP or UDP ports associated with the flow type, and may be used to match a data flow with a flow type. The bandwidth may be the expected bandwidth usage of the flow, such as in bits per second. The flow type mission utility may correspond to the network priority of the flow type, where a higher flow type mission utility may indicate a higher priority. In some examples, the mission utility may be expressed as a numerical value, such as integers, such as from 0 to 100, 0 to 70, and the like.

In some examples, network template 18 may also specify a default flow type. Data flows that are not matched to any flow types in the list of flow types may be assigned to the default flow type. The default flow type may specify a default flow type mission utility that may be assigned to such unmatched flows.

In some examples, each flow type may be associated with a default optimization basis associated with a parent traffic class of the flow type. A flow type may override the default optimization basis by specifying, in network template 18, values for 1) a throughput size or speed of the traffic class, 2) a response latency or jitter of the traffic class, 3) a stability (e.g., associated with a reduction of errors) of the traffic class, 4) and any other suitable information. The optimization basis may be used by routers (e.g., router device 10A and router device 11) as well as network management system 20 to perform autonomous optimization of, e.g., complex joint network 4.

Router device 10A or router device 11 may determine the flow type of the data flow based on at least one of: the source port of the data flow or the destination port of the data flow. That is, router device 10A or router device 11 may determine whether a flow type in the plurality of flow types specified by network template 18 specifies a port or a range of ports that matches at least one of the source port of the data flow or the destination port of the data flow.

As described above, a flow type may have an associated flow mission utility. If router device 10A or router device 11 determines that the data flow is associated with a flow type in the plurality of flow types specified by network template 18, router device 10A or router device 11 may determine a flow type mission utility associated with the data flow as the flow type mission utility of the flow type specified in network template 18.

In some examples, router device 10A or router device 11 may use the source port of the data flow to determine the flow type of the data flow and a source flow type mission utility associated with the data flow. Router device 10A or router device 11 may determine whether a flow type in the plurality of flow types specified by network template 18 matches the source port of the data flow. If router device 10A or router device 11 determines that a flow type in the plurality of flow types specified by network template 18 matches the source port of the data flow, router device 10A or router device 11 may determine a source flow type mission utility associated with the data flow as the flow type mission utility of the flow type specified in network template 18.

In some examples, router device 10A or router device 11 may also use the destination port of the data flow to determine a destination flow type of the data flow and the flow type mission utility associated with the data flow. Router device 10A or router device 11 may determine whether a flow type in the plurality of flow types specified by network template 18 matches the destination port of the data flow. If router device 10A or router device 11 determines that a flow type in the plurality of flow types specified by network template 18 matches the destination port of the data flow, router device 10A or router device 11 may determine a destination flow type mission utility associated with the data flow as the flow type mission utility of the flow type specified in network template 18.

If router device 10A or router device 11 determines both a source flow type mission utility and a destination flow type mission utility, router device 10A or router device 11 may select the greater of the source flow type mission utility and the destination flow type mission utility as the flow type mission utility associated with the data flow. If router device 10A or router device 11 determines that the data flow is not associated with any of the flow types in the plurality of flow types specified by network template 18, router device 10A or router device 11 may determine the flow type mission utility associated with the data flow as the flow type mission utility of the default mission type.

In some examples, to determine the mission utility associated with a data flow, router device 10A or router device 11 may determine a source mission element associated with the data flow and a destination mission element associated with the data flow based on network template 18 and the contents of data packets of the data flow. Mission elements are endpoint users or the names of an endpoint computing device, such as one of client devices 12 or an endpoint machine server. As such a source mission element may correspond to the mission element associated with the source of the data flow and a destination mission element may correspond to the mission element associated with the destination of the data flow. Endpoint users may have an associated rank, title, name, and the like, while endpoint devices may have names (e.g., domain names), IP addresses, and the like. The mission elements may be associated with priorities based on, for example, the rank of the endpoint user, the usage of the endpoint device, and the like.

In some examples, network template 18 may specify a plurality of mission elements, where each mission element in the plurality of mission element, may specify a network address, and a mission element utility. The network address may be, for example, an IP address or other network address, and may be used for matching data flows to the mission element.

The mission element utility may correspond to the network priority of mission element, where a higher mission element utility may indicate a higher priority, such that flows from the mission element and/or to a mission element may be prioritized based at least in part on the associated mission element utility. In some examples, the mission element utility may be expressed as a numerical value, such as integers. One example of a range of values for the mission element utility may be from 0 to 70, 0 to 100, or any other suitable range of values.

In some examples, network template 18 may also include a default mission element having a default mission utility. If a data flow is not matched with one of the plurality of mission elements specified by network template 18, the data flow may be associated with the default mission element.

To determine the source mission element associated with the data flow and the destination mission element associated with the data flow, router device 10A or router device 11 may determine, from the contents of data packets of the data flow, the source network address and the destination network address of a data packet of the data flow. The source network address and the destination network address of a data packet of the data flow may be considered the source network address and the destination network address of the data flow.

Router device 10A or router device 11 may determine the source mission element associated with the data flow based on determining whether the plurality of mission elements specified by network template 18 include a mission element having a network address that matches the source network address of the data flow. That is, router device 10A or router device 11 may determine whether the plurality of mission elements in network template 18 includes a mission element having a network address that is the same value as the source network address of the data flow.

Router device 10A or router device 11 may determine the destination mission element associated with the data flow based on determining whether the list of mission elements in network template 18 includes a mission element having a network address that matches the destination address of the data flow. That is, router device 10A or router device 11 may determine whether the plurality of mission elements specified by network template 18 includes a mission element having a network address that is the same value as the destination network address of the data flow.

Router device 10A or router device 11 may also determine a source mission elements utility associated with the data flow as the mission element utility of the source mission element of the data flow. If router device 10A or router device 11 determines that the plurality of mission elements specified by network template 18 includes a mission element having a network address that matches the source network address of the data flow, router device 10A or router device 11 may determine a source mission element utility associated with the data flow as the mission element utility of the mission element having the network address that matches the source network address of the data flow.

Router device 10A or router device 11 may also determine a destination mission element utility associated with the data flow as the mission element utility of the destination mission element of the data flow. If router device 10A or router device 11 determines that the list of mission elements in network template 18 includes a mission element having a network address that matches the destination network address of the data flow, router device 10A or router device 11 may determine a destination mission element utility associated with the data flow as the mission element utility of the mission element having the network address that matches the destination network address of the data flow.

Router device 10A or router device 11 may determine the mission element utility associated with the data flow as the greater of the source mission element utility and the destination mission element utility. If network template 18 does not include a mission element in the list of mission elements having a network address that matches the destination network address of the data flow or the source network address of the data flow, router device 10A may determine a mission element utility associated with the data flow as the mission utility of the default mission element specified in network template 18.

Router device 10A or router device 11 may determine a mission utility associated with the data flow based on one or more of: the flow type mission utility associated with the data flow and/or the mission element utility. In some examples, router device 10A or router device 11 may determine the mission utility associated with the data flow as the sum of the flow type mission utility associated with the data flow and the mission element utility associated with the data flow. In other examples, router device 10A or router device 11 may determine the mission utility associated with the data flow as the average (e.g., mean) of the flow type mission utility associated with the data flow and the mission element utility associated with the data flow, the greater of the flow type mission utility associated with the data flow and the mission element utility, and the like.

Router device 10A may control the admission of the data flow based at least in part on the mission utility associated with the data flow and the traffic class associated with the data flow. As described above, a traffic class is associated with a bandwidth allocation, which may be the amount of available bandwidth at one or more interfaces of router device 10A that can be allocated for all data flows associated with the traffic class that router device 10A encounters. For example, a traffic class may be allocated a percentage of the total bandwidth at one or more interfaces of router device 10A as specified by the bandwidth allocation associated with the traffic class.

Router device 10A may determine whether to admit the data flow based at least in part on determining whether the available bandwidth in the bandwidth allocation associated with the traffic class is sufficient for the data flow. That is, router device 10A or router device 11 may determine the expected bandwidth of the data flow, and router device 10A may determine whether the amount of bandwidth not currently being used to receive and route data flows in the bandwidth allocation associated with the traffic class is greater than or equal to the expected bandwidth of the data flow.

As described above, network template 18 may specify, for a flow type, the expected bandwidth of the flow. As such, router device 10A or router device 11 may determine the flow type of the data from network template 18 based on the source port and/or destination port of the data flow and may determine, based on network template 18, the expected bandwidth for the flow type associated with the data flow as the expected bandwidth of the data flow. If the expected bandwidth of the data flow is less than or equal to the amount of bandwidth not currently being used to receive and route data flows in the bandwidth allocation associated with the traffic class, router device 10A or router device 11 may admit the data flow.

If the expected bandwidth of the data flow is greater than the amount of bandwidth not currently being used to receive and route data flows in the bandwidth allocation associated with the traffic class, router devices along the path of the data flow, such as router device 10A, router device 11, router device 14, router device 10D, and the like, may determine whether to admit the data flow based at least in part on the mission utility associated with the data flow. Specifically, router device 10A may compare the mission utility associated with the data flow with the mission utility associated with the other data flows associated with the traffic class that are currently being admitted by router device 10A. If the mission utility associated with the data flow is not greater than the mission utility of at least one data flow associated with the traffic class that is currently being admitted by router device 10A, router device 10A may refrain from admitting the data flow.

If the mission utility associated with the data flow is greater than the mission utility of at least one data flow associated with the traffic class that is currently being admitted by router device 10A, router device 10A may determine whether dropping (i.e., ceasing admission) a currently admitted data flow associated with the traffic class having the lowest mission utility would increase the amount of bandwidth not currently being used to be greater than or equal to the expected bandwidth of the data flow. If router device 10A determines that dropping the currently admitted data flow associated with the traffic class having the lowest mission utility would increase the amount of bandwidth not currently being used to be greater than or equal to the expected bandwidth of the data flow, router device 10A may admit the data flow.

If router device 10A determines that dropping the currently admitted data flow associated with the traffic class having the lowest mission utility would not increase the amount of bandwidth not currently being used to be greater than or equal to the expected bandwidth of the data flow, router device 10A may determine whether the mission utility associated with the data flow is greater than the second lowest mission utility of the one or more data flows associated with the traffic class that is currently being admitted by router device 10A. If router device 10A determines that the mission utility associated with the data flow is not greater than the second lowest mission utility of the one or more data flows associated with the traffic class that is currently being admitted by router device 10A, router device 10A may refrain from admitting the data flow.

If router device 10A determines that the mission utility associated with the data flow is greater than the second lowest mission utility of the one or more data flows associated with the traffic class that is currently being admitted by router device 10A, router device 10A may determine whether dropping currently admitted data flows associated with the traffic class having the lowest mission utility and the second lowest mission utility would increase the amount of bandwidth not currently being used to be greater than or equal to the expected bandwidth of the data flow. If router device 10A determines that dropping the two currently admitted data flows would increase the amount of bandwidth not currently being used to be greater than or equal to the expected bandwidth of the data flow, router device 10A may admit the data flow. In this way, router device 10A may use the mission utility and the traffic class associated with a data flow to determine whether to admit the data flow.

Figure 2:
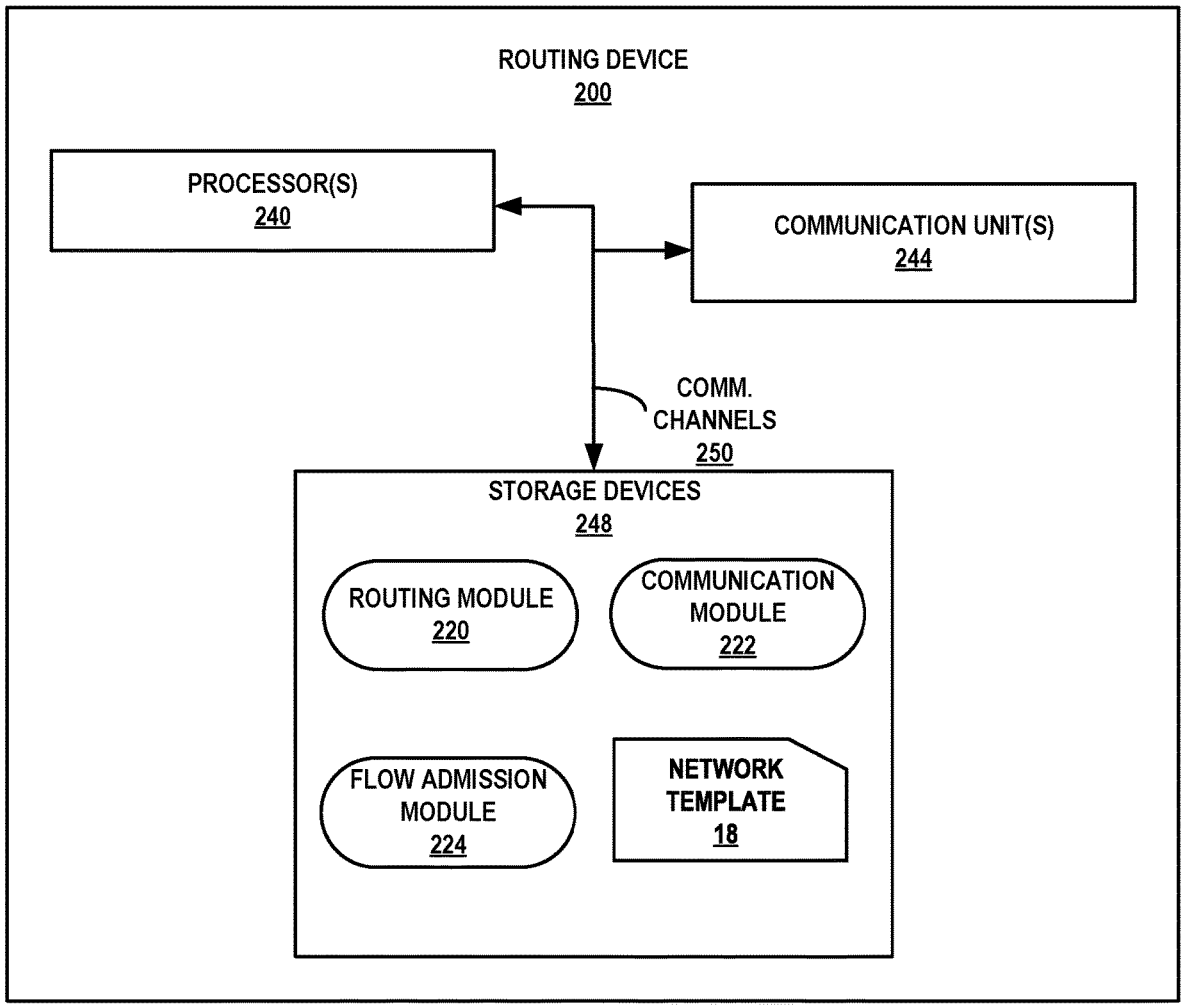
FIG. 2 is a block diagram illustrating a routing device that perform flow admission control in accordance with one or more techniques of this disclosure.

FIG. 2 is a block diagram illustrating router device 200 that perform flow admission control in accordance with one or more techniques of this disclosure. Router device 200 of FIG. 2 is an example of one of router devices 10A-10E, router device 11, router device 14, and the like of FIGS. 1A and 1B, as well as any other router device described throughout this disclosure and is described below within the context of system 2 of FIGS. 1A and 1B. FIG. 2 illustrates only one particular example of router device 200 and many other examples of router device 200 may be used in other instances. Router device 200 of FIG. 2 may include a subset of the components included in example router device 200 or may include additional components not shown in FIG. 2.

As shown in the example of FIG. 2, router device 200 includes one or more processors 240, one or more communication units 244, and one or more storage devices 248. Storage devices 248 of router device 200 also include routing module 220, communication module 222, and flow admission module 224. One or more processors 240 may implement functionality and/or execute instructions within router device 200. For example, processors 240 on router device 200 may receive and execute instructions stored by storage devices 248 that execute the functionality of routing module 220, communication module 222, and flow admission module 224. These instructions executed by processors 240 may cause router device 200 to perform any quality of service technique such as flow admission control during program execution. That is, routing module 220, communication module 222, and flow admission module 224 may be operable by processors 240 to perform various actions or functions of router device 200, for instance, routing data flows to and from internal network 6A and complex joint network 4 and to perform flow admission control of data flows to and from internal network 6A and complex joint network 4.

Routing module 220, communication module 222, and flow admission module 224 may rely on information received by communication units 244. In other words, as is described in more detail below, modules 200-224 may be operable by processors 240 to perform operations on information received by communication units 244 from an outside computing device, such as network management system 20 or complex joint network 4. Although shown as software modules in the example of FIG. 2, router device 200 may execute the functions for performing the techniques of this disclosure using firmware, an application-specific integrated circuit (ASIC), or some combination of firmware, software, and ASICs.

Communication channels 250 may interconnect each of the components 200, 222, 224, 240, 244, and 248 for inter-component communications (physically, communicatively, and/or operatively). In some examples, communication channels 250 may include a system bus, a network connection, an inter-process communication data structure, or any other method for communicating data.

One or more communication units 244 of router device 200 may communicate with external devices via one or more wired and/or wireless networks by transmitting and/or receiving network signals on the one or more networks. Each communication unit 244 may include multiple ports for receiving and/or sending traffic flows to outside devices, such as a client device or one or more nodes in complex joint network 4. Examples of communication unit 244 include a network interface card (e.g., an Ethernet card), an optical transceiver, a radio frequency transceiver, a GPS receiver, or any other type of device that can send and/or receive information. Other examples of communication units 244 may include short wave radios, cellular data radios, wireless network radios, as well as universal serial bus (USB) controllers.

One or more storage devices 248 within router device 200 may store information for processing during operation of router device 200 (e.g., router device 200 may store data that modules 200, 222, and 224 access during execution at router device 200). In some examples, storage device 248 may function as a temporary memory, meaning that one purpose of storage device 248 is not long-term storage. Storage devices 248 on router device 200 may configured to include short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 248 may also be configured to store larger amounts of information than volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or information (e.g., data) associated with modules 200, 222, and 224.

In accordance with techniques of this disclosure, communication module 222 of router device 200 may receive, via communication units 244, data flows. Communication module 222 may receive, via communication units 244, the data flows from internal network 6A for router device 200 to route across complex joint network 4 to another of internal networks 6, or communication module 222 may receive, via communication units 244, the data flows from complex joint network 4 for router device 200 to route to one of client devices 12.

Flow admission module 224 may, in response to receiving a data flow, determine, based on network template 18, the mission utility associated with the data flow and the traffic class associated with the data flow. Flow admission module 224 may, based on the mission utility associated with the data flow and the traffic class associated with the data flow, determine whether to admit the data flow.

In some examples, if router device 200 receives encrypted data flows, such as router device 10A in FIG. 1B, flow admission module 224 may receive, from network management system 20 or a router device (e.g., router device 11 in FIG. 1B) in a plaintext portion of the network, tags associated with data flows that may include any one or combination of the source network address and source port of the data packet, the destination network address and the destination port, the transport protocol identifier for the data packet, as well as other relevant information associated with the data packet. In some examples, the tags may include an indication of the mission utility associated with the data flow and the traffic class associated with the data flow.

In some examples, if router device 200 is a router device in a plaintext portion of a crypto-partitioned network, such as router device 11 in FIG. 1B, flow admission module 224 may determine tags associated with the data flow, and may transmit the tags to network management system 20 and/or to a corresponding router device, such as router device 10A in FIG. 1B, in the encrypted portion of the crypto-partitioned network. The tag associated with a data flow may include any one or combination of the source network address and source port of the data packet, the destination network address and the destination port, the transport protocol identifier for the data packet, as well as other relevant information associated with the data packet. In some examples, the tags may include an indication of the mission utility associated with the data flow and the traffic class associated with the data flow.

Router device 200 may store a copy of network template 18 in storage devices 248. For example, when router device 200 begins its operations, routing device may communicate with network management system 20 to receive the last version of network template 18 and may store network template 18 in storage devices 248.

To determine the mission utility associated with the data flow and the traffic class associated with the data flow, flow admission module 224 may determine the flow type associated with the data flow. For example, flow admission module 224 may determine, from the header of the data packets of the data flow or a tag associated with the data flow, the source network address, the source network port, the destination network address, and the destination port associated with the data flow, and flow admission module 224 may determine, based on the source network port and/or destination network port, the flow type associated with the data flow.

Flow admission module 224 determine, based on network template 18, the flow type associated with the data flow. For example, flow admission module 224 may determine the flow type associated with the data flow as the flow type specified in network template 18 as having a port that matches the source network port associated with the data flow and/or the destination network port associated with the data flow. Flow admission module 224 may determine a flow type mission utility associated with the data flow as the flow type mission utility associated with the determined flow type specified by network template 18.

In some examples, flow admission module 224 may determine, based on network template 18, a source flow type associated with the data flow as the flow type specified in network template 18 as having a port that matches the source port associated with the data flow. Flow admission module 224 may therefore determine a source flow type mission utility associated with the data flow as the flow type mission utility associated with the determined source flow type specified by network template 18.

Similarly, flow admission module 224 may determine, based on network template 18, a destination flow type associated with the data flow as the flow type specified in network template 18 as having a port that matches the destination port associated with the data flow. Flow admission module 224 may therefore determine a destination flow type mission utility associated with the data flow as the flow type mission utility associated with the determined destination flow type specified by network template 18.

In some examples, flow admission module 224 may determine, based on network template 18, mission elements associated with the data flow. For example, flow admission module 224 may determine the mission element associated with the data flow as the mission element specified in network template 18 as having a network address that matches the source network address associated with the data flow and/or the destination network address associated with the data flow. Flow admission module 224 may determine a mission element utility associated with the data flow as the mission element utility associated with the determined mission element specified by network template 18.

In some examples, flow admission module 224 may determine, based on network template 18, a source mission element associated with the data flow as the mission element specified in network template 18 as having a network address that matches the source network address associated with the data flow. Flow admission module 224 may therefore determine a source mission element utility associated with the data flow as the mission element utility associated with the determined source mission element specified by network template 18.

Similarly, flow admission module 224 may determine, based on network template 18, a destination mission element associated with the data flow as the mission element specified in network template 18 as having a network address that matches the destination network address associated with the data flow. Flow admission module 224 may therefore determine a destination mission element utility associated with the data flow as the mission element utility associated with the determined destination mission element specified by network template 18.

Flow admission module 224 may therefore determine the mission utility associated with the data flow based at least in part on a flow type mission utility and the mission element utility associated with the data flow. For example, flow admission module 224 may determine a flow type mission utility associated with the data flow as the greater of the source flow type mission utility and the destination flow type mission utility, or may determine the flow type mission utility as the flow type mission utility associated with a default flow type if the flow type associated with the data flow is the default flow type. Similarly, flow admission module 224 may determine a mission element utility associated with the data flow as the greater of the source mission element utility and the destination mission element utility, or may determine the mission element utility as the mission element utility associated with a default mission element if the mission element associated with the data flow is the default mission element. Flow admission module 224 may therefore determine the mission utility associated with the data flow as the sum of the flow type mission utility associated with the data flow and the mission element utility associated with the data flow.

Flow admission module 224 may determine, based on network template 18, the traffic class associated with the data flow. For example, flow admission module 224 may determine the traffic class associated with the data flow as the traffic class specified in network template 18 as having a port that matches the source network port associated with the data flow and/or the destination network port associated with the data flow.

Flow admission module 224 may determine, based on the determined mission utility associated with a data flow and the traffic class associated with the data flow, whether to admit the data flow. Flow admission module 224 may determine the amount of available bandwidth in the bandwidth of a network link to allocated to the traffic class and may determine whether the expected bandwidth usage associated with the flow type is less than or equal to the amount of available bandwidth in the bandwidth of the network link allocated to the traffic class. If the expected bandwidth usage associated with the flow type is less than or equal to the amount of available bandwidth in the bandwidth in the network link allocated to the traffic class, flow admission module 224 may admit the data flow.

If the expected bandwidth usage associated with the flow type is greater than the amount of available bandwidth in the bandwidth in the network link allocated to the traffic class, flow admission module 224 may determine whether one or more data flows associated with the traffic class can be dropped to increase the amount of available bandwidth in the bandwidth in the network link allocated to the traffic class to accommodate the data flow. Flow admission module 224 may determine whether the mission utility of the data flow is greater than the mission utilities of one or more other data flows in the traffic class currently being admitted by router device 200.

If flow admission module 224 determines that the mission utility of the data flow is greater than the mission utilities of one or more other data flows in the traffic class currently being admitted by router device 200, flow admission module 224 may determine whether dropping the one or more other data flows in the traffic class that are associated with lower mission utilities would increase the amount of available bandwidth in the bandwidth allocated to the traffic class to be equal to or greater than the expected bandwidth usage associated with the flow type.

If flow admission module 224 determines that dropping one or more other data flows in the traffic class that are associated with lower mission utilities would increase the amount of available bandwidth in the bandwidth allocated to the traffic class to be equal to or greater than the expected bandwidth usage associated with the flow type, flow admission module 224 may drop the one or more other data flows in the traffic class that are associated with lower mission utilities and may admit the data flow. Conversely, if flow admission module 224 determines that even dropping every other data flows in the traffic class that are associated with lower mission utilities would not increase the amount of available bandwidth in the bandwidth allocated to the traffic class to be equal to or greater than the expected bandwidth usage associated with the flow type, flow admission module 224 may refrain from admitting the data flow. In this way, flow admission module 224 may perform admission control of data flows.

Figure 3:
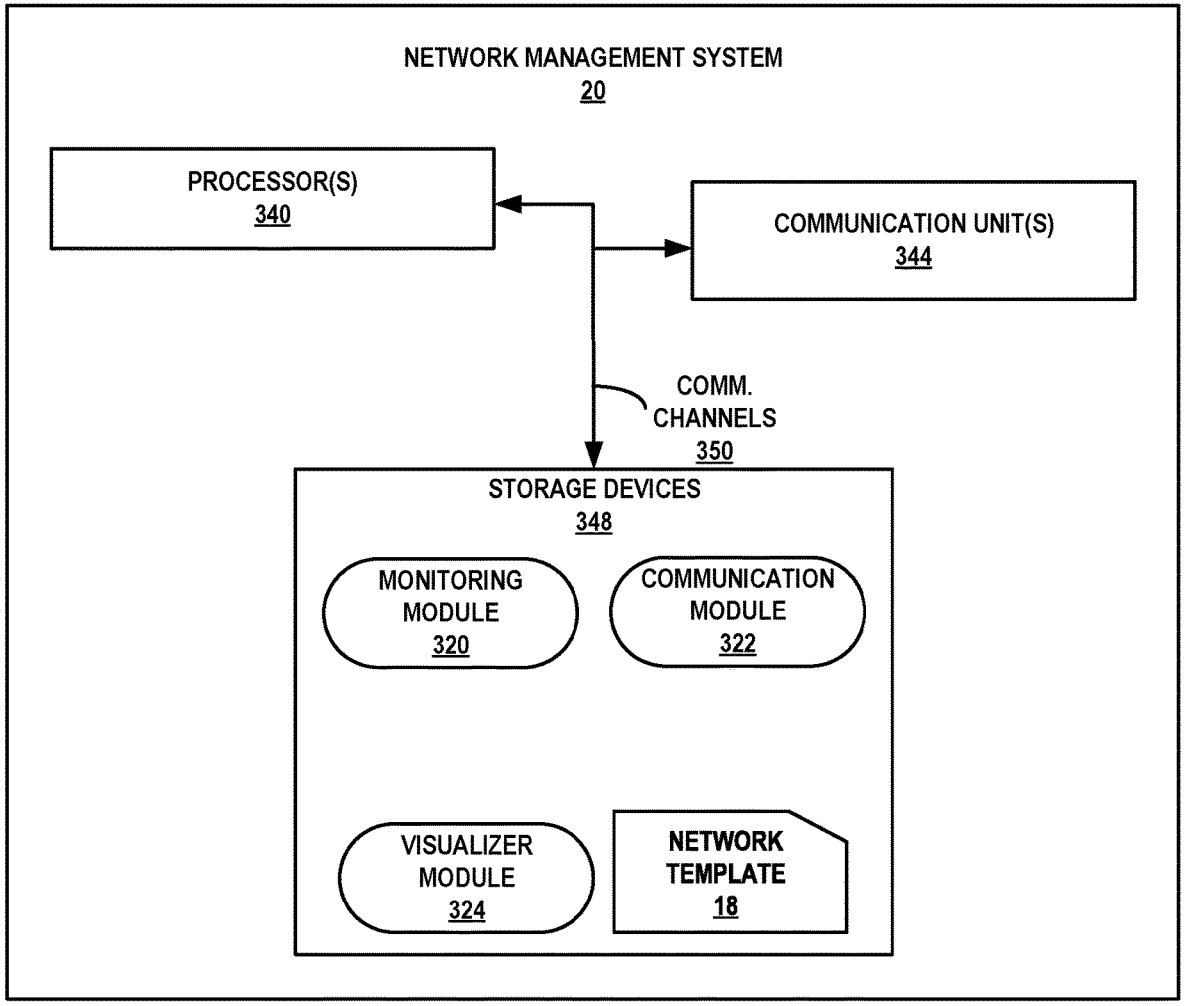
FIG. 3 is a block diagram illustrating a network management system that manages a complex joint network in accordance with one or more techniques of this disclosure.

FIG. 3 is a block diagram illustrating network management system 20 that manages a complex joint network 4 in accordance with one or more techniques of this disclosure. Network management system 20 of FIG. 3 is described below within the context of system 2 of FIGS. 1A and 1B. FIG. 3 illustrates only one particular example of network management system 20, and many other examples of network management system 20 may be used in other instances. Network management system 20 of FIG. 3 may include a subset of the components included in example network management system 20 or may include additional components not shown in FIG. 3, and may be used to manage and optimize networks that include an encrypted core with unencrypted edge enclaves or an unencrypted network.

As shown in the example of FIG. 3, network management system 20 includes one or more processors 340, one or more communication units 344, and one or more storage devices 348. Storage devices 348 of network management system 20 also include monitoring module 320, communication module 322, visualizer module 324, and network template 18. One or more processors 340 may implement functionality and/or execute instructions within network management system 20. For example, processors 340 on network management system 20 may receive and execute instructions stored by storage devices 348 that execute the functionality of monitoring module 320, communication module 322, and visualizer module 324. These instructions executed by processors 340 may cause network management system 20 to monitor complex joint network 4. That is, monitoring module 320, communication module 322, and visualizer module 324 may be operable by processors 340 to perform various actions or functions of network management system 20, for instance, monitoring complex joint network 4, deriving tags associated with active flows in complex joint network 4, and providing a visualization of complex joint network 4.

Monitoring module 320, communication module 322, and visualizer module 324 may rely on information received by communication units 344. In other words, as is described in more detail below, modules 200-324 may be operable by processors 340 to perform operations on information received by communication units 344 from an outside computing device, such as router devices 10 of complex joint network 4. Although shown as software modules in the example of FIG. 3, network management system 20 may execute the functions for performing the techniques of this disclosure using firmware, an application-specific integrated circuit (ASIC), or some combination of firmware, software, and ASICs.

Communication channels 350 may interconnect each of the components 200, 322, 324, 340, 344, and 348 for inter-component communications (physically, communicatively, and/or operatively). In some examples, communication channels 350 may include a system bus, a network connection, an inter-process communication data structure, or any other method for communicating data.

One or more communication units 344 of network management system 20 may communicate with external devices via one or more wired and/or wireless networks by transmitting and/or receiving network signals on the one or more networks. Each communication unit 344 may include multiple ports for receiving and/or sending traffic flows to outside devices, such as a client device or one or more nodes in complex joint network 4. Examples of communication unit 344 include a network interface card (e.g., an Ethernet card), an optical transceiver, a radio frequency transceiver, a GPS receiver, or any other type of device that can send and/or receive information. Other examples of communication units 344 may include short wave radios, cellular data radios, wireless network radios, as well as universal serial bus (USB) controllers.

One or more storage devices 348 within network management system 20 may store information for processing during operation of network management system 20 (e.g., network management system 20 may store data that modules 200, 322, and 324 access during execution at network management system 20). In some examples, storage device 348 may function as a temporary memory, meaning that one purpose of storage device 348 is not long-term storage. Storage devices 348 on network management system 20 may configured to include short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 348 may also be configured to store larger amounts of information than volatile memory. Storage devices 348 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 348 may store program instructions and/or information (e.g., data) associated with modules 200, 322, and 324.

Network management system 20 may use network template 18 to manage complex joint network 4 regardless of whether complex joint network 4 transports encrypted data packets or unencrypted data packets. Network template 18 may include one or more files that include information regarding naming conventions, subnets, links, flow types, quality of service (QoS) settings, and other types of information that can be used by router devices 10 as well as any other suitable devices and systems in system 2. For example, network template 18 may include information that can be used by a visualizer tool in system 2 to auto-configure items and flows that can be tracked and displayed by the visualizer tool. Network template 18 may be created and stored in network management system 20, and nodes of complex joint network 4 may be able to retrieve network template 18 during initialization of the nodes.

In some examples, network template 18 may include definitions and associations such as global lookup settings for items (e.g., users, nodes, link types, networks, subnetworks, etc.) within complex joint network 4, including defining DNS servers, LDAP servers, mission databases, and the like used to lookup such items.

Network template 18 may also include information for configuring the data used by router devices 10 to perform dynamic flow admission control and make real-time QoS decisions throughout complex joint network 4. For example, network template 18 may defines the types of flows that are identified and/or permitted throughout complex joint network 4 and may, for each identified flow, include information that can be used by router devices 10 to make real-time QoS decisions regarding flow admissions.

In some examples, network template 18 may specify a list of flow types, where a flow type indicates the type of data flow associated with the flow type. Examples of flow types may include a voice over IP (VoIP) flow type, a world wide web (WWW) flow type, a chat flow type, and the like.

Network template 18 may, for each flow type in the list of flow types, specify one or more of: a port, a name, a bandwidth, a mission utility, and a color. The port may be a TCP or UDP port or range of ports associated with the flow type, and may be used to match a flow with a flow type. The name may be a name used to identify the flow. Examples of names may include "FMV", "Video-conference", "VoIP", "web", "YouTube", and the like. The bandwidth may be the expected bandwidth usage of the flow, such as in bits per second.

The mission utility may correspond to the network priority of the flow type, where a higher mission utility may indicate a higher priority. Thus, a first data flow having a higher mission utility than a second flow may be prioritized over the second data flow. In some examples, the mission utility may be expressed as a numerical value, such as integers. One example of a range of values for the mission utility may be from 0 to 100, 0 to 70, −10 to 10, and the like, although other ranges of values are also contemplated in this disclosure. The color may be the color of the flow as displayed by a visualizer, such as a visualizer in network management system 20. In some examples, the color may be expressed as any valid CSS color string, such as "ff0000", "red", or "rgb(255,0,0)".

In some examples, network template 18 may also include a default flow type. Flows that are not matched to any flow types in the list of flow types may be assigned to the default flow type. The default flow type may specify a default mission utility that may be assigned to such unmatched flows. In some examples, network template 18 may specify whether a flow type in the list of flow types is to be used as the default flow type for unmatched flows.

In some examples, network template 18 may specify a list of traffic classes. Network template 18 may, for each traffic class in the list of traffic classes, specify one or more of: a name, a bandwidth allocation, and one or more data flows that fall under the traffic classes.

The name may be a name used to identify the traffic class. Examples of names may include "video", "voice", etc. The bandwidth allocation may be the amount of available bandwidth to allocate for the traffic class. The bandwidth allocation may be specified as a percentage of available bandwidth, the amount of bandwidth in, for example, bits per second, or any other suitable expression of the amount of bandwidth allocated to the traffic class. In some examples, the bandwidth allocation may be the amount of available bandwidth in complex joint network 4 to allocate for the traffic class.

The one or more data flows may be the flows that are assigned to the traffic class. The flows that are assigned to the traffic class may be specified as ports associated with the flow. Flows assigned to the traffic class may be admitted under the traffic class's bandwidth allocation. In some examples, only flows assigned to the traffic class may be admitted under the traffic class's bandwidth allocation, unless the traffic class has available bandwidth allocation for accommodating flows that are not assigned to the traffic.

In some examples, network template 18 may also include a default traffic class. If a flow is not matched with one of the flow types listed in network template 18, the flow may be an unmatched flow that is associated with the default traffic class, and any remaining unallocated bandwidth may be used to admit such unmatched flows. If no unallocated bandwidth remains or if the remaining unallocated bandwidth is less than the expected bandwidth used by the unmatched data flow, then a router device may refrain from admitting the unmatched data flow. In some examples, network template 18 may specify whether a traffic class in the list of traffic classes is to be used as the default traffic class for unmatched flows.

In some examples, network template 18 may include a set of flow groups to group multiple data flows into a single flow, such as for visualization purposes. For example, network template 18 may specify a flow group of data flows associated with a specified traffic class, data flows associated with a specified flow type, data flows from a first specified user to a second specified user, and the like.

In some examples, network template 18 may specify a list of security domains. Network template 18 may, for each security domain in the list of security domains, specify one or more of: a name, a network, and a color. The name may be a name used to identify the network domain. The network may be a range of network addresses (e.g., IP network addresses such as 192.168.1.0/224) by which nodes of complex joint network 4 are matched to a security domain. The color may be the color of nodes associated with the security domain as displayed by a visualizer, such as a visualizer in network management system 20. In some examples, the color may be expressed as any valid CSS color string, such as "ff0000", "red", or "rgb(255,0,0)".

In some examples, network template 18 may specify a list of mission elements, where mission elements are endpoint users or the names of an endpoint computing device, such as one of client devices 12 or an endpoint machine server. Network template 18 may, for each mission element in the list of mission element, specify one or more of: a name, a looked up name, a user identifier (UID), a network address, and a mission utility. The name may be a name used to identify the mission element. The looked up name may be a name looked up via LDAP or DNS, such as a hostname or username associated with the mission element. The UID may be a network-unique (e.g., unique to complex joint network 4) identifier for the mission element. The network address may be, for example, an IP address or other network address, and may be used for matching flows to the mission element.

The mission utility may correspond to the network priority of mission element, where a higher mission utility may indicate a higher priority, such that flows from the mission element and/or to a mission element may be prioritized based at least in part on the associated mission utility. In some examples, the mission utility may be expressed as a numerical value, such as integers. One example of a range of values for the mission utility may be from 0 to 70, although other ranges of values are also contemplated in this disclosure In addition, network template 18 may, for each mission element, specify additional information associated with the mission element that is looked up via LDAP or DNS, such as users associated with the endpoint, the name, rank responsibilities, and the like of the users associated with the end point, and/or the mission utility value.

In some examples, network template 18 may also include a default mission element having a default mission utility. If a mission element is not matched with one of the mission elements listed in network template 18, the mission element may be an unmatched mission element that is associated with the default mission element.

In some examples, network template 18 may specify a list of link types, where links are network links in complex joint network 4, such as links between router devices 10A, subnets 8, SATCOM network 16, and the like. Network template 18 may, for each link type in the list of link types, specify one or more of: a name, a maximum bandwidth, link name prefixes, and a medium of the link. The name may be a name used to identify the link. Examples of names may include "Unknown", "RF-CDL", "Optical", "RF-WiFi", "Ethernet", "RF-SRW", etc. The link name prefixes may be case-insensitive strings used to match router-reported links (e.g., links reported by router devices 10) to link types. The medium of the link may be, for example, include an optical medium, a Common Data Link (CDL) medium, Ethernet, WiFi, and the like. The maximum bandwidth may be the expected maximum bandwidth of the link, and may correspond to the medium of the link. In some examples, network template 18 may, for each link type, also specify additional information such as whether the link type is an air-to-air link, an air-to-ground link, a ground-to-ground link, and the like, whether the link type is a wired link or a wireless link, the currently measured size of the link as determined from real-time values updated from routing devices 10, and the like. In some examples, network template 18 may specify whether a link type in the list of link types is to be used as the default link type for unmatched links.

In some examples, network template 18 may specify a list of nodes, where nodes are devices in complex joint network 4, such as router devices 10, client devices 12, router device 14, and the like. Network template 18 may, for each node in the list of nodes, specify one or more of: a name, a node ID, a paired node ID, an icon, and node name prefixes. The name may be a name used to identify the node. If network template 18 does not specify a name for a node, the name for the node may be inferred as the node ID. The node ID may identify a node and may be the ID received from a corresponding node, such as a router in complex joint network 4. The paired node ID may be the node ID of a node on the other side of an INE, such as INE 9 from the corresponding node in complex joint network 4. The icon may be the icon that represents the node when displayed by a visualizer. The node name prefixes may be case-insensitive strings used to match the beginning of router-reported nodes (e.g., nodes reported by router devices 10) to node types. In some examples, network template 18 may also specify a default icon that represents any unmatched nodes when displayed by a visualizer.

Network template 18 may also specify one or more autonomous and/or manual control and/or configuration settings for routers and devices in complex joint network 4. Such settings may include Application Programming Interface (API) settings, plug-in settings for routers, and the like. Such settings may also include settings for performing beam switching, such as cubic beam switching or auto-based beam switching to known discovered paths. Such settings may include settings for enabling and disabling interfaces and links of router devices in complex joint network 4, and may include settings for throttling the capacity of interfaces and links of router devices in complex joint network 4. These settings may enable network management system 20 to perform smart optimization of complex joint network 4.

Network template 18 may also specify priority and autonomous network optimization settings, such as priority and/or mission utility settings, which may include QoS settings, flow admission control settings, and multiple router tables. Such settings, which may be specified in the optimization basis associated with traffic classes and/or flow types, may specify traffic-aware settings for using different router tables for routing data flows based on the traffic in complex joint network 4 to optimize for latency and/or mission-aware settings for using different routing tables for routing data flows based on the mission to optimize for trust.

In some examples, network template 18 may also specify thresholds, such as a target CNP for complex joint network 4, formula options for CNP, as well as constants and the like that specify trade-off settings, such as for race conditions, tie breakers, and the like. These settings may also enable network management system 20 to perform smart optimization of complex joint network 4. In some examples, network template 18 may also specify settings to perform smart rebalancing of complex joint network 4.

An example network template 18 is as follows:

{
  "FlowTypes": [
    {
      "Port": 80,
      "Name": "WWW",
      "Bandwidth": 5001,
      "MissionUtility": 70,
      "Color": "grey"
    },
    {
      "Port": 9987,
      "Name": "voip",
      "Bandwidth": 2002,
      "MissionUtility": 70,
      "Color": "grey"
      "OptimizationBasis":"latency"
    },
    {
      "Port": 5004,
      "Name": "fjord",
      "Bandwidth": 15000000,
      "MissionUtility": 50,
      "Color": "darkorange"
      "OptimizationBasis":"latency"
    },
    {
      "Port": 6004,
      "Name": "hockey",
      "Bandwidth": 3900000,
      "MissionUtility": 20,
      "Color": "grey"
      "OptimizationBasis": "latency"
    },
    {
      "Port": 8765,
      "Name": "iperf",
      "Bandwidth": 10000,
      "MissionUtility": 60,
      "Color": "grey"
    },
    {
      "Port": 389,
      "Name": "ldap",
      "Bandwidth": 1000,
      "MissionUtility": 70,
      "Color": "grey"
    },
    {
      "Port": 8080,
      "Name": "Cyvis",
      "Bandwidth": 100,
      "MissionUtility": 50,
      "Color": "grey"
    },
    {
      "Port": 1234,
      "Name": "Chat_A_1",
      "Bandwidth": 1000,
      "MissionUtility": 40,
      "Color": "red"
    },
    {
      "Port": 1235,
      "Name": "Chat_A_2",
      "Bandwidth": 1000,
      "MissionUtility": 40,
      "Color": "orange"
    },
    {
      "Port": 1236,
      "Name": "Chat_A_3",
      "Bandwidth": 1000,
      "MissionUtility": 40,
      "Color": "yellow"
    },
    {
      "Port": 1237,
      "Name": "Chat_A_4",
      "Bandwidth": 1000,
      "MissionUtility": 40,
      "Color": "yellowgreen"
    },
    {
      "Port": 1238,
      "Name": "Chat_A_5",
      "Bandwidth": 1000,
      "MissionUtility": 40,
      "Color": "green"
    },
    {
      "Port": 1239,
      "Name": "Chat_A_6"
      "Bandwidth": 1000,
      "MissionUtility": 40,
      "Color": "lightblue"
    },
    {
      "Port": 1340,
      "Name": "Chat_A_7",
      "Bandwidth": 1000,
      "MissionUtility": 40,
      "Color": "blue"
    }
  ],
  "FlowTypeDefault": {
    "Bandwidth": 5000,
    "MissionUtility": 10,
    "Color": "lightgrey"
    "OptimizationBasis": "throughput"
  },
  "SecurityDomains": [
    {
      "Name": "AFRL Domain",
      "Network": "192.168.0.0/16",
      "Color": "hotpink"
    },
    {
      "Name": "Black Core",
      "Network": "10.0.0.0/8",
      "Color": "teal"
    }
  ],

```
"TrafficClasses": [
  {
    "Name": "Chat",
    "Allocation": 10,
    "Flows": [
      9987,
      8765,
      389,
      1234,
      1235,
      1236,
      1237,
      1238,
      1239,
      1340,
      1241,
      1242,
      1243,
      1244,
      1245,
      1246,
      1248,
      1247
    ],
    "OptimizationBasis":"latency"
  },
  {
    "Name": "VoIP",
    "Allocation": 25,
    "Flows": [
      8080
    ],
    "OptimizationBasis": "latency"
  },
  {
    "Name": "video",
    "Allocation": 35,
    "Flows": [
      8080
    ],
    "OptimizationBasis": "throughput"
  },
  {
    "Name": "Other",
    "DefaultClass": "yes",
    "Allocation": 20,
    "Flows": [
      5004,
      6004,
      0
    ],
    "OptimizationBasis": "throughput" }}
  },
]
  "MissionElements": [
    {
      "Name": "Middle",
      "AccountName": "middle",
      "MissionUtility": 15,
      "Address": "192.168.17.2"
    },
    {
      "Name": "Left",
      "AccountName": "left",
      "MissionUtility": 5,
      "Address": "192.168.11.2"
    },
    {
      "Name": "Right",
      "AccountName": "right",
      "MissionUtility": 10,
      "Address": "192.168.15.2"
    },
    {
      "Name": "GEP",
      "AccountName": "gep",
      "MissionUtility": 20,
      "Address": "192.168.19.2"
    },
    {
      "Name": "Rome",
      "AccountName": "Rome",
      "MissionUtility": 20,
      "Address": "192.168.89.100"
    }
  ],
  "MissionElementDefault":
    "MissionUtility": 10
  },
  "LinkTypes": [ ],
  "NodeTypes": [
    {
      "Name": "GEP",
      "Icon": "DGE.png",
      "Prefixes": [
        "dge",
        "gep"
      ]
    },
    {
      "Name": "DeployedRadar",
      "Icon": "Comms.png",
      "Prefixes": [
      "sb"
      ]
    },
    {
      "Name": "Aerial Gateway",
      "Icon": "UAV.png",
      "Prefixes": [
        "middle"
      ]
    },
    {
      "Name": "Rome",
      "Icon": "Tent.png",
      "Prefixes": [
      "Rome"
      ]
    },
    {
      "Name": "TE",
      "Icon": "Hummer.png",
      "Prefixes": [
        "right",
        "left"
      ]
    }
  ],
  "NodeTypeDefault": {
  "Icon": "Plane.png"
  },
  "TrafficGroups": [
    { }
```

],
  "MissionElementsDefault": {
    "MissionUtility": 5
  }
}

In some examples, monitoring module 320 may determine information regarding data flows in complex joint network 4 based on information reported by nodes of complex joint network 4 to network management system 20, such as router configuration data, the information contained in network template 18, as well as information reported by other servers and systems, such as a Domain Name System, a Lightweight Directory Access Protocol (LDAP) server, and the like.

Monitoring module 320 may use communication module 322 to communicate with nodes of complex joint network 4. For example router devices (e.g., router devices 10) in complex joint network 4 may report, for each flow sensed by the router devices, the source network address, the source port, the destination network address, the destination port, the protocol ID, and the differentiated services code point (DSCP). In the case where complex joint network 4 is an encrypted network, router devices on the plain-text side of the network (e.g., router device 11 behind INE 9) may report, for each flow sensed by the router devices, a tag associated with the data flow that specifies one or more of: the plaintext side source network address, the source port, the plaintext side destination network address, the destination port, the protocol ID, and the differentiated services code point (DSCP). Meanwhile, router devices (e.g., router devices 10) in the encrypted side of the network may report, for each flow sensed by the router devices, the encrypted side source network address, the encrypted side destination address, and the DSCP. Monitoring module 320 may, based on such information received from nodes of complex joint network 4, perform one-to-one mappings between flows in the plaintext side of the network and flows in the encrypted side of the network.

As described above, monitoring module 320 may receive tags from router devices in joint complex network 4, such as from router device 11, router devices 10, and the like, for all active flows in complex joint network 4. There may be two types of tags: dynamic tags and static tags. A static tag associated with a data flow may contain information that does not change over a mission, such as the flow type associated with the data flow and the bandwidth required for the data flow. A dynamic tag associated with a data flow may include information that may change during the course of a mission, such as mission elements terminating the data flow and the mission utility associated with the data flow.

Routing devices such as routing device 11 may determine the static tags associated with data flows before the occurrence of mission operations based on one or more association rules, which may be collected in network template 18. For example, a rule may determine the flow type associated with a data flow based on the source port of the data flow and the transport protocol of the data flow, and may determine the amount of bandwidth reserved for the data flow based on the data type. One example of such a rule is: (1) "If (source port=260) AND (protocol ID=UDP) THEN Flow Type=HD FMV"; (2) "If (Flow Type=HD FMV) THEN (Bandwidth Reservation=5 Mbps)".

Network management system 20 may interface with external servers, such as DNS servers, LDAP servers, mission databases, and the like to obtain dynamic tag information for flows. In the case of the example rule with respect to the example data flow describe above, when network management system receives a report of a sensed UDP flow with source port 260, a source network address of S, and a destination network address of D, monitoring module 320 may communicate with a DNS server to perform a reverse DNS look-up on source network address S to determine that the "HD FMV" data flow has a source mission element of "UVDS" and may communicate with an LDAP server to perform a LDAP lookup to determine that the destination mission element for the data flow at destination network address D is User 1. When User 1 logs out of the node at destination network address D and is replaced by User 2 at the destination node, monitoring module 320 may determine, based on performing a LDAP lookup at the LDAP server, that the current user at address D is User 2, and may therefore update the dynamic tag information associated with the data flow to specify that the destination mission element is User 2. For example, because User 1 and User 2 may be associated with different mission element utilities, monitoring module 320 and/or router device 11 may update the dynamic tag with the updated destination mission element utility with the mission element utility of user 2 and/or may update the calculated mission utility of the data flow based on the mission element utility of user 2.

In this way, monitoring module 320 may receive, for each active flow in complex joint network 4, a static tag and a dynamic tag. Network management system 20 may store the created static tags and dynamic tags, such as in a database on storage devices 248.

Network management system 20 may, using settings from network template 18 and data collected by network monitoring module 320, to compute Real-time the Normalized Cumulative Network Performance (CNP) values, where the CNP is defined as:

$$\text{Normalized Cumulative Network Performance } (CNP) = \frac{1}{CNP_0} \sum_{tasks} r_i p_i(t_i)$$

$CNP_0$=Maximum achievable CNP value during network event
$r_i$=rank/priority of network task i (larger number is higher priority)
$p_i(t_i)$=performance utility (PerfUtil) function for networking task i
$t_i$=completion time of networking task i If the CNP is below 100% (i.e., if 1 or more flows were not admitted by a router device in complex joint network 4), then network management system 20 may search the representative network (e.g., complex joint network 4) for unused available bandwidth in secondary, tertiary, etc. links. Based on current allowed flows and the unused available bandwidth, network management system 20 may perform simulations of various sets of specific changes (e.g., traffic-aware routing; mission-aware routing, enabling and disabling links in the network, performing beam steering, etc.). For example, network management system 20 may simulate different ways of routing various data flows in network management system 20 through such unused available bandwidth in the links. Network management system 20 may recalculate CNP for each simulated set of changes, then determine specific changes to complex joint network 4 based on the best CNP achieved by the simulated set of changes.

In some examples, network management system 20 may present, such as by outputting for display at a display device, an indication of the set of simulated changes (e.g., the links to be enabled and/or disabled, the specific beam steering to be performed on nodes, the set traffic-ware and/or mission-aware routing, etc.), so that an administrator may determine whether to make such changes to complex joint network 4. In some cases, network management system 20 may, based on settings in network template 18, automatically implement the changes to complex joint network 4 with or without administrator input, such as by formulating and sending commands to nodes of complex joint network 4 to make such changes, such as sending commands to turn on or off links, commands to perform beam steering, commands to make changes to traffic-ware and/or mission-aware routing of the nodes, and the like, such as described with respect to FIGS. 4-6.

Visualizer module 324 may use the static tags and dynamic tags created using monitoring module 320, as well as network template 18, to provide a visualization of active data flows in complex joint network 4. Specifically, visualizer module 324 may output a graphical user interface (GUI) that presents real-time operational information regarding complex joint network 4 determined by network management system 20 to provider network administrators with situational awareness of complex joint network 4. Such a GUI may present an end-to-end view of data flows in complex joint network 4 along with information associated with the data flows in complex joint network 4, such as information associated with active data flows in complex joint network 4, information associated with links in complex joint network 4, information associated with nodes in complex joint network 4, information associated with users in joint network 4, and the like. For example, visualizer module 324 may present, in the GUI, the tags associated with data flows, such as the static and dynamic tags as described above, and may automatically tag the end-to-end view of data flows presented in the GUI with endpoint node labels, mission utility metrics, link names, flow types, flow names, users, and the like.

In some examples, the GUI that is outputted by visualizer module 324 may highlight and present data flows that may require attention by an operator of complex joint network 4. For example, the GUI may highlight data flows that have been denied admission to a router device in complex joint network 4 and may also highlight competing data flows vying for the same network resources as the denied data flows. In some examples, the GUI that is outputted by visualizer module 324 may also enable an operator to query for data flows of interest based on one or more attributes and may present, in the GUI, the data flows that matches the one or more attributes.

In some examples, visualizer module 324 may output the GUI for display at a display device operably coupled to network management system 20. In other examples, visualizer module 324 may output the GUI to a computing device that is connected to network management system 20, such as a computing device in the field that are connected via a network to network management system 20, and such a computing device may output the GUI for display at a display device operably coupled to the computing device.

Figure 4:
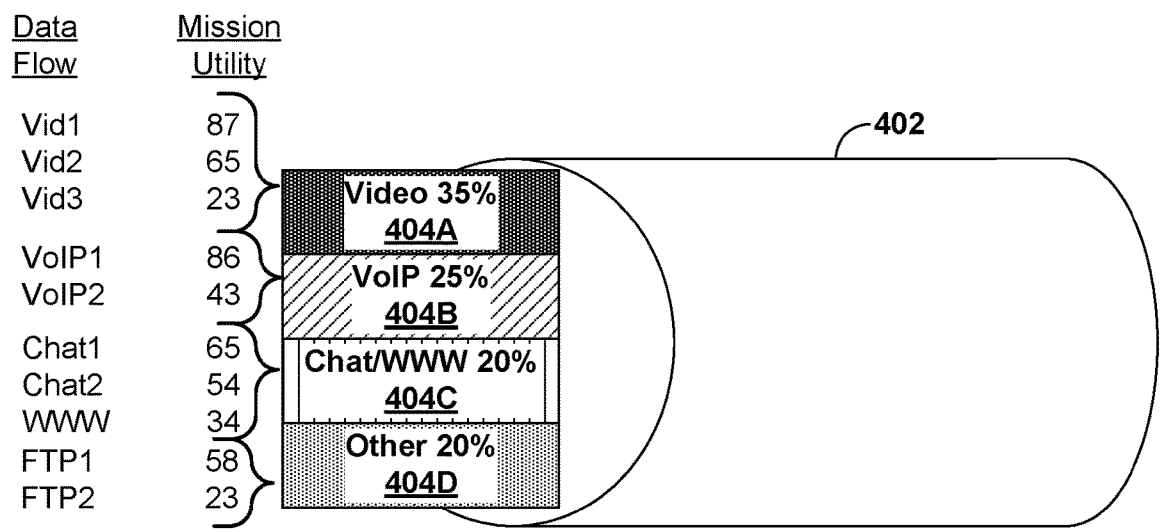
FIG. 4 illustrates bandwidth allocation of a network link in the complex joint network of FIGS. 1A and 1B.

FIG. 4 illustrates bandwidth allocation of a network link in complex joint network 4 of FIGS. 1A and 1B. The network link may be a network link through which a router device of FIGS. 1A and 1B, such as one of router devices 10, router device 11, router device 14, and the like may transmit data flows received by the router device. As shown in FIG. 4, the bandwidth of link 402 connected to the router device may be allocated based on traffic classes, where a guaranteed amount of bandwidth in link 402 may be reserved for each traffic class of data flows. For example, 35% of the bandwidth of link 402 is reserved for data flows in video traffic class 404A, 25% of the bandwidth of link 402 is reserved for data flows in voice over IP (VoIP) traffic class 404B, 20% of the bandwidth of link 402 is reserved for data flows in chat and world wide web (WWW) traffic class 404C, and the remaining 20% of the bandwidth of link 402 is reserved for data flows in other traffic classes.

In some examples, the bandwidth allocated for a traffic class is reserved for data flows of that traffic class and may not be used for data flows of other traffic classes, even for data flows of other traffic classes that are associated with a very high mission utility. Thus, for example, video traffic class 404A may be reserved for only video traffic and may not be used for VoIP traffic.

Data flows within a traffic class are prioritized by the mission utility associated with data flows. For example, in video traffic classic 404A, the data flow Vid1 has a mission utility of 87, data flow Vid2 has a mission utility of 65, and data flow Vid3 has a mission utility of 23. Thus, Vid3 may be dropped in order for link 402 to carry another data flow associated with the video traffic class 404A if the other data flow is associated with a mission utility that is higher than 23. Because the data flows carried by link 402 may change over time, if data flow Vid3 is dropped, data flow Vid3 may re-request readmittance to router device 10A. If, later on, the mission utility associated with data flow Vid3 is higher than the mission utility of another data flow associated with video traffic class 404A, data flow Vid3 may be readmitted to router device 10A.

Figure 5:
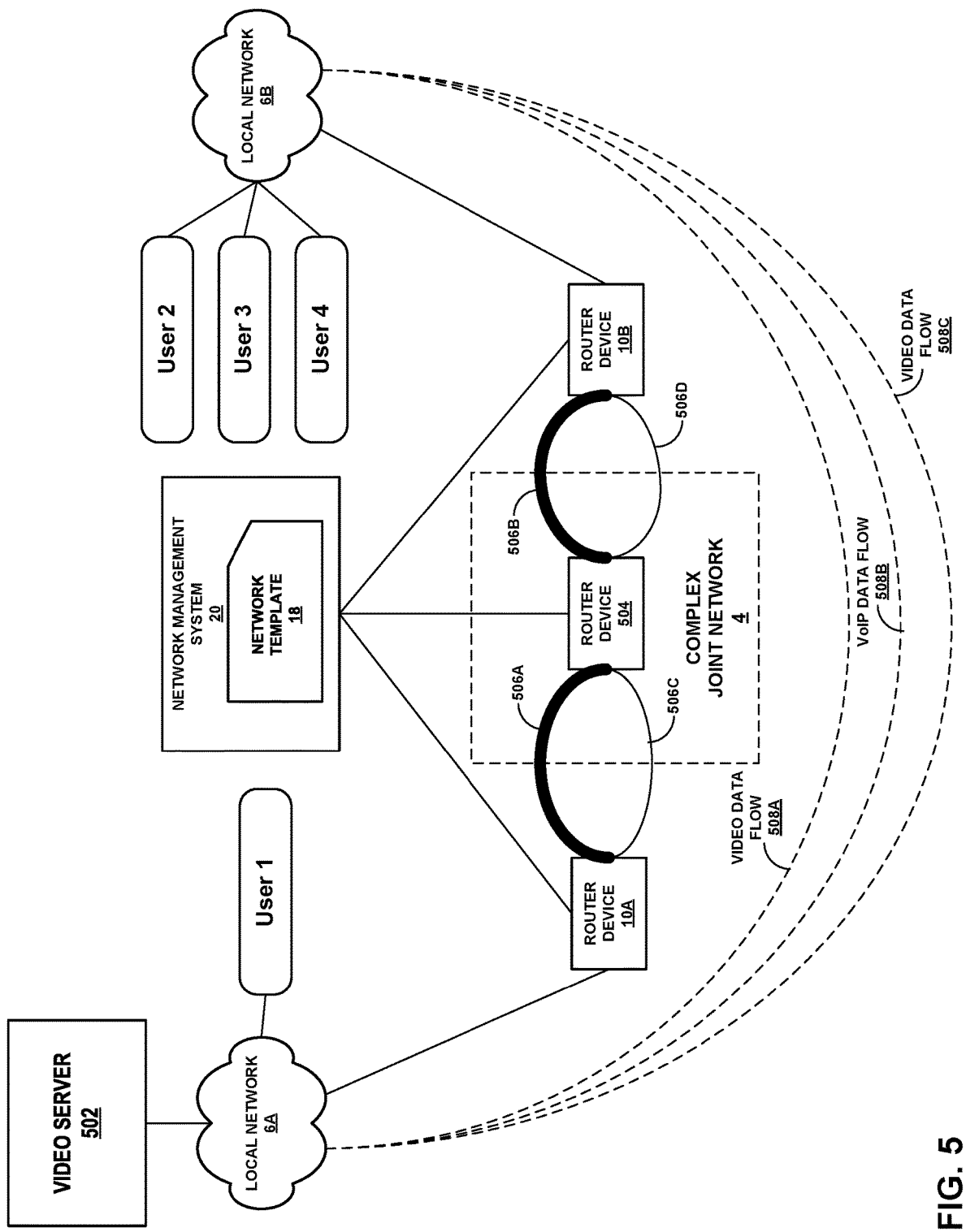
FIG. 5 is a block diagram illustrating dynamic balancing of network paths in accordance with the techniques of this disclosure.

FIG. 5 is a block diagram illustrating dynamic balancing of network paths in accordance with the techniques of this disclosure. Such dynamic balancing of network paths can be performed in conjunction with flow admission control, as described in this disclosure, to autonomously optimize complex joint network 4.

As shown in FIG. 5, network links 506A-506D may form multiple different paths between router device 10A and router device 10B to connect internal networks 6A and 6B. Network links 506A and 506B may be broadband links, such as links having 10 megabits per second (Mbps) of bandwidth, while network links 506C and 506D may be narrow bank links, such as links having 100 kilobits per second (kbps) of bandwidth.

A path between router device 10A and router device 10B can be formed by network link 506A between router device 10A and router device 504 in complex joint network 4 and network link 506B between router device 504 and router device 10B. In another example, a path between router device 10A and router device 10B can be formed by network link 506A between router device 10A and router device 504 and network link 506D between router device 504 and router device 10B. In another example, a path between router device 10A and router device 10B can be formed by network link 506C between router device 10A and router device 504 and network link 506B between router device 504 and router device 10B. In another example, a path between router device 10A and router device 10B can be formed by network link 506C between router device 10A and router device 504 and network link 506D between router device 504 and router device 10B.

In the example of FIG. 5, video server 502 in internal network 6B may stream video data to user 2 at internal network 6B in the form of video data flow 508A at a rate of 5 Mbps. User 1 at internal network 6A may also be connected to user 3 at internal network 6B in a VoIP call in the form of VoIP data flow 508B at a rate of 100 kbps. Because links 506A and 506B are higher qualify links than links 506C and 506D due to links 506A and 506B having greater available bandwidth than links 506C and 506D, router device 10A and 504 may route the 5 Mbps video data flow 508A carrying the streaming video data through broadband network links 506A and 506B, and may also route the 100 kbps VoIP data flow 508B carrying the VoIP call through broadband network links 50A and 506B.

Because links 506A and 506B having 10 Mbps of bandwidth is carrying both the 5 Mbps video data flow 508A to user 2 at internal network 6B and the 100 kbps VoIP data flow 508B between user 1 at internal network 6A and user 3 at internal network 6B, links 506A and 506B may only have 4.9 Mbps of available bandwidth to carry other data flows between internal networks 6A and 6B. If video server 502 subsequently attempts to stream a second video data flow 508C of video data to user 4 at internal network 6B at a rate of 5 Mbps, links 506A and 506B may not have available bandwidth to carry the second video data flow 508C without router devices 10A, 10B, and 504 dropping the video data flow 508A or the VoIP data flow 508B currently being carried by links 506A and 506B.

If the second video data flow 508C to be streamed to user 4 at internal network 6B has the same or smaller mission utility as the video data flow 508A streamed to user 2 at internal network 6B and the VoIP data flow 508B, such as determined using network template 18, router devices 10A, 10B, and 504 may not be able to drop the video data flow 508A or the VoIP data flow 508B currently being carried by links 50A and 506B to accommodate the second video data flow 508C because the mission utility of the second video data flow 508C is not greater than the mission utility of the video data flow 508A or the VoIP data flow 508B.

In accordance with aspects of this disclosure, router devices, such as router devices 10A, 10B, and 504, in complex joint network 4 as well as network management system 20 may communicate each other to probe and determine alternative paths between router devices 10A, 10B, and 504, such as to determine multiple different paths between such router devices 10A, 10B, and 504 and to determine the quality of the different paths, such as the available bandwidth of each of the multiple different paths. In some examples, router devices 10A, 10B, and 504 may exchange information, such as in the form of data packets, that includes information associated with links that are connected to interfaces of router devices 10A, 10B, and 504. In some examples, router devices 10A, 10B, and 504 may communicate with network management system 20 to determine information associated with links that are connected to interfaces of router devices 10A, 10B, and 504.

Router devices 10A, 10B, and 504 may use such information associated with links that are connected to interfaces of router devices 10A, 10B, and 504 to determine the existence of multiple paths between router device 10A, 10B, and 504. For example, router device 10A may receive, from router device 504, an indication that router device 504 is connected to router device 10B via links 506B and 506D. Because router device 10A is connected to router device 504 via links 506A and 506C, router device 10A may be able to determine that router device 10A can be connected to router device 10B via multiple paths using a combination of links 506A-506D.

Similarly, router device 10B may receive, from router device 504, an indication that router device 504 is connected to router device 10A via links 506A and 506C. Because router device 10B is connected to router device 504 via links 506B and 506D, router device 10B may be able to determine that router device 10B can be connected to router device 10A via multiple paths using a combination of links 506A-506D. In this way, router device 10A may determine that router device 10A can be connected to router device 10B via both 10 Mbps links 506A and 506B and 100 kbps links 506C and 506D.

In accordance with aspects of the present disclosure, router devices, such as router devices 10A, 10B, and 504, in complex joint network 4 that are connected via links to form multiple paths between the router devices may be able to move flows from one path of the multiple paths to another path of the multiple paths to optimize the amount of data flows that can be carried between the router devices.

In some examples, if the multiple paths between router devices include a higher quality path (e.g., a higher bandwidth path, a path with smaller packet loss, etc.) and a lower quality path (e.g., a lower bandwidth path, a path with greater packet loss, etc.), network management system 20 may direct the router devices to move data flows between the higher quality path and the lower quality path to increase the utilization of paths between the router devices and to increase the number of data flows that can be transmitted between the router devices. For example, if a data flow associated with a relatively higher mission utility being transmitted between router devices via the higher quality path prevents data flow associated with a relatively lower mission utility from being transmitted via any of the multiple paths between the router devices, network management system 20 may direct the router devices to move the data flow associated with the relatively higher mission utility from the higher quality path to the lower quality path to accommodate the data flow associated with the relatively lower mission utility in the higher quality path in order to admit both data flows in the multiple paths.

In the example of FIG. 5, the path between router devices 10A and 10B formed using links 506A and 506B may be a higher quality path compared with the path formed using links 506C and 506D because the 10 Mbps path formed using links 506A and 506B has more available bandwidth compared with the 100 kbps path formed using links 506C and 506D. The higher quality path of links 506A and 506B may utilize 5.1 Mbps of the 10 Mbps bandwidth of links 506A and 506B to carry 5 Mbps video data flow 508A and 100 kbps VoIP data flow 508B, thereby leaving the higher quality path of links 506A 506B with 4.9 Mbps of available bandwidth for carrying other data flows.

If router device 10A subsequently receives 5 Mbps video data flow 508C associated with a mission utility that is not greater than the mission utility associated VoIP data flow 508B or the mission utility associated with video data flow 508A, neither the higher quality path of links 506A and 506B nor the lower quality path of links 506C and 506D may be able to accommodate video data flow 508C because the higher quality path of links 506A and 506B may only have 4.9 Mbps of available bandwidth while the lower quality path of links 506C and 506D may only have 100 kbps of available bandwidth. Thus, router device 10A may fail at its attempt to reserve 5 Mbps of bandwidth in any of links 506A-506D to accommodate video data flow 508C.

In order to accommodate and admit video data flow 508C, network management system 20 may direct router device 10A to move VoIP data flow 508B from the higher quality path of links 506A and 506B to the lower quality path of links 506C and 506D, even though VoIP data flow 508B is associated with the same or greater mission utility than the mission utility associated with video data flow 508C. To move VoIP data flow 508B, router device 10A may drop VoIP data flow 508B on links 506A and 506B and may instead admit VoIP data flow 508B on links 506C and 506D.

By moving VoIP data flow 508B to the lower quality path of links 506C and 506D, router device 10A increases the available bandwidth of higher quality path of links 506A and 506B from 4.9 Mbps to 5 Mbps, thereby enabling higher quality path of links 506A and 506B to carry the 5 Mbps video data flow 508A as well as the Mbps video data flow 508C. Network management system 20 may, in response to router device 10A moving VoIP data flow 508B to the lower quality path of links 506C and 506D, be able to successfully reserve 5 Mbps of bandwidth in links 506A and 506B to accommodate video data flow 508C. In this way, router device 10A may be able to admit and transmit video data flow 508A, VoIP data flow 508B, and video data flow 508C to router device 10B via the multiple paths between router devices 10A and 10B.

Figure 6A:
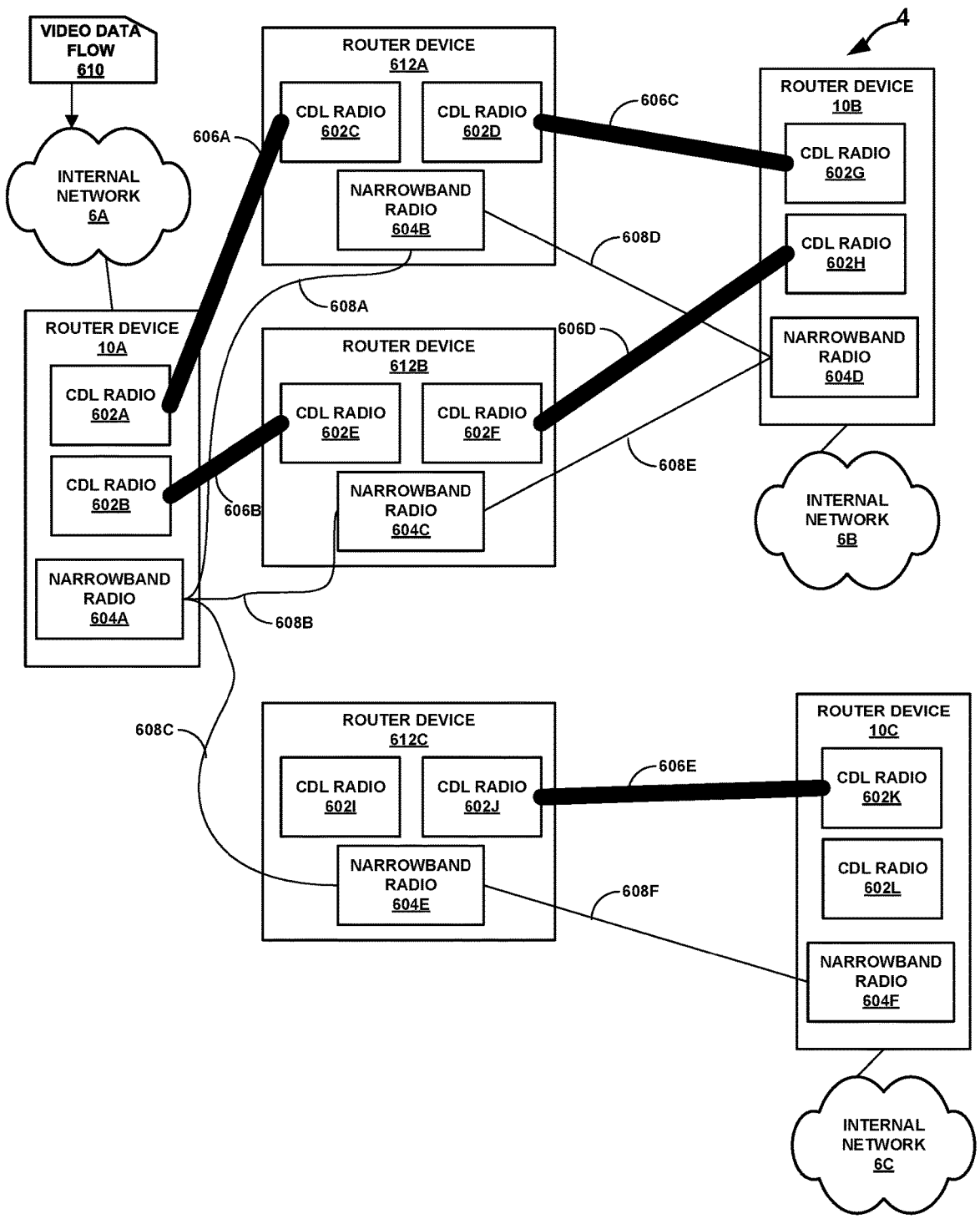
FIGS. 6A and 6B are block diagrams illustrating redirection of data flows, in accordance with aspects of the present disclosure.
Figure 6B:
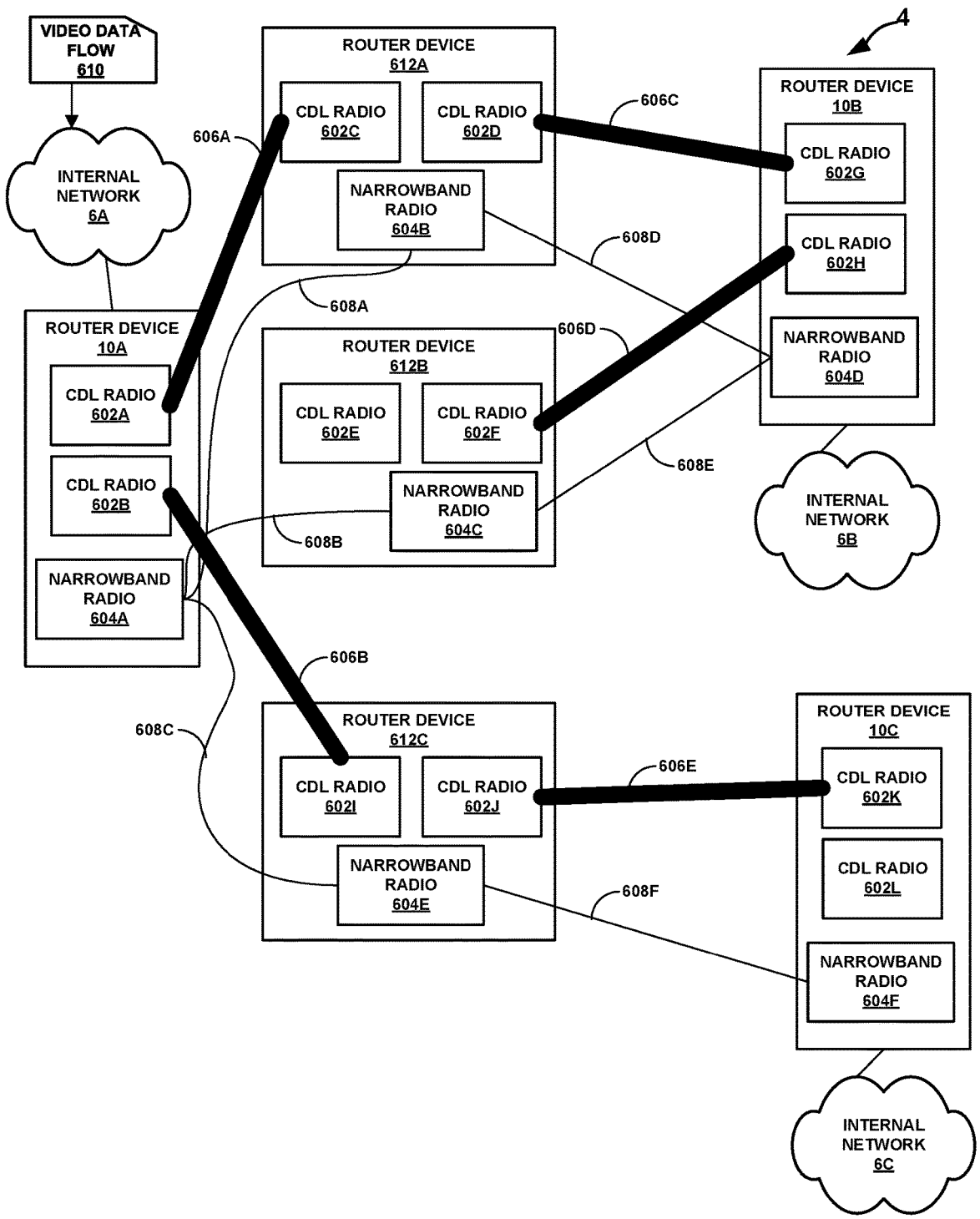

FIGS. 6A and 6B are block diagrams illustrating redirection of data flows, in accordance with aspects of the present disclosure. As shown in FIG. 6A, complex joint network 4 may include router devices 10A-10C and router devices 612A-612C that include Common Data Link (CDL) radios 602A-602L that provide wireless broadband links 606A-606E and narrowband radios 604A-604F that provide wireless narrowband links 608A-608F for wirelessly connecting router devices 10A-10C and router devices 612A-612C.

In general, wireless broadband links 606A-606E may have much greater bandwidth compared with narrowband links 608A-608F. For example, wireless broadband link 606A has a bandwidth of 10 Mbps, wireless broadband link 606B has a bandwidth of 5 Mbps, wireless broadband link 606C has a bandwidth of 10 Mbps, wireless broadband link 606D has a bandwidth of 8 Mbps, and wireless broadband link 606E has a bandwidth of 10 Mbps. Meanwhile narrowband links 608A-608F may each have a bandwidth of less than 1 Mbps.

To transmit video data flow 610 that uses 4 Mbps of bandwidth from internal network 6A to a user at internal network 6B, router device 10A may utilize wireless broadband link 606B having 5 Mbps of bandwidth to transmit video data flow 610 to router device 612B, and router device 612B may utilize wireless broadband link 606D to transmit video data flow 610 to router device 10B, which may transmit video data flow 610 to the user at internal network 6B. Meanwhile, router device 10A may also transmit other data flows using wireless broadband links 606A-606E and narrowband links 608A-608F to internal network 6B in parallel.

If the destination of video data flow 610 changes from a user at internal network 6B to a user at internal network 6C, network management system 20 may determine that there is not a path between router device 10A and router device 10C connected to internal network 6C that has sufficient bandwidth to transmit video data flow 610. For example, network management system 20 may determine that to route video data flow 610 to router device 10C, router device 10A can only route video data flow 610 through router device 612C. However, network management system 20 may determine that the only link between router device 10A and router device 612C is narrowband link 608C that does not have sufficient bandwidth to transmit video data flow 610.

In some examples, network management system 20 may, in response to determining a change in the destination of a data flow, redirect the data flow by directing router device 10A to establish a broadband path having sufficient bandwidth to carry the data flow between router device 10A and the destination of the data flow. As shown in FIG. 6B, network management system 20 may, in response to determining a change in the destination of video data flow 610 from internal network 6B to internal network 6C, direct router device 10A to move wireless broadband link 606B from connecting router device 10A and router device 612B to instead connect router device 10A and router device 612C, thereby establishing a broadband path via wireless broadband link 606B and wireless broadband link 606E between router device 10A and router device 10C.

In some examples, to move wireless broadband link 606B from connecting router device 10A and router device 612B to instead connect router device 10A and router device 612C, network management system 20 may direct router device 612B to turn off CDL radio 602E to stop receiving data via wireless broadband link 606B, and network management system 20 may direct router device 612C to turn on CDL radio 6021 to begin receiving data via wireless broadband link 606B. CDL radio 6061 may therefore be able to discover CDL radio 602B and lock its beam to CDL radio 602D to create wireless broadband link 606B. In another example, network management system 20 may direct router device 10A to make a beam switch at CDL radio 602D to direct its signals to CDL radio 6061 to create wireless broadband link 606B. Once wireless broadband link 606B has been moved to connect router device 10A and router device 612C, network management system 20 may direct router device 10A to redirect video data flow 610 via wireless broadband link 606B to router device 10C.

FIGS. 7A-7J illustrate a graphical user interface that includes information regarding complex joint network 4 to provide mission oriented network visibility of complex joint network 4, in accordance with the techniques of the present disclosure. As described throughout this disclosure, network management system 20 may receive, from nodes of complex joint network 4, such as from router devices 10, subnets 8, router device 17, and the like, information regarding flows sent and/or received by nodes of network management system. Network management system 20 may receive such information and may, using network template 18, determine various real-time information regarding such flows, as well as nodes, links, users, and the like. In addition, network management system 20 may also derive real-time information associated with the health of complex joint network 4 based on the received information.

Network management system 20 may therefore output a GUI that presents real-time operational information regarding complex joint network 4 determined by network management system 20 to provider network administrators with situational awareness of complex joint network 4. In some examples, network management system 20 may output the GUI for display at a display device operably coupled to network management system 20. In other examples, network management system 20 may output the GUI to a computing device that is connected to network management system 20, such as a computing device in the field that are connected via a network to network management system 20, and such a computing device may output the GUI for display at a display device operably coupled to the computing device. For example, a computing device may use a web browser to connect to a web server that operates on network management system 20 to access a website that provides the GUI.

Figure 7A:
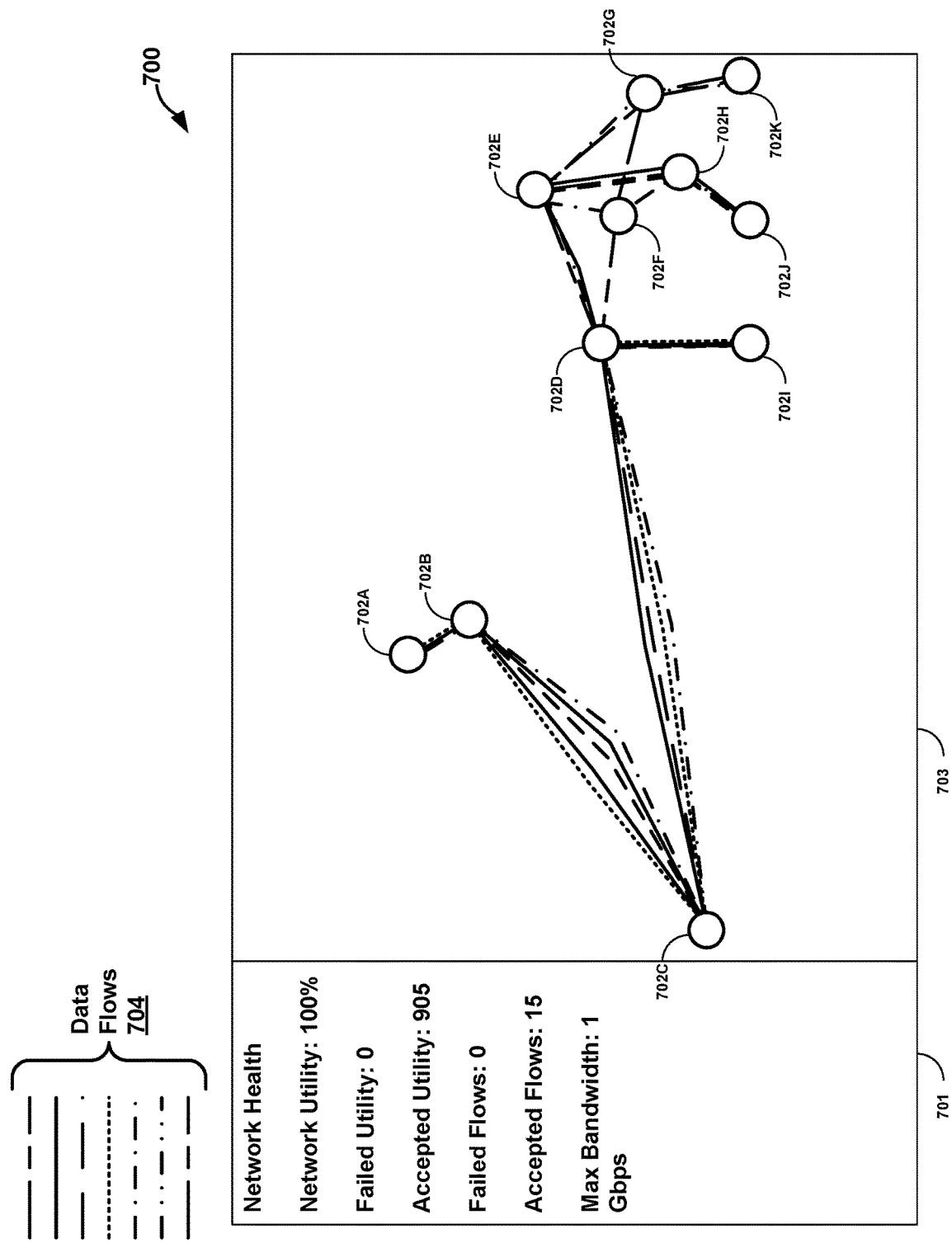
FIGS. 7A-7J illustrate a graphical user interface that includes information regarding a complex joint network to provide mission oriented network visibility of the complex joint network and provides a level of network adaption and control of the complex joint network, in accordance with the techniques of the present disclosure.

As shown in FIG. 7A, network management system 20 may create and output GUI 700 to present various information regarding complex joint network 4. GUI 700 may include information pane 701 and network visualization pane 703. Network visualization pane 703 may include a graphical representation of the nodes, flows, and the like of complex joint network 4. For example, network visualization pane 703 may include graphical representations of nodes 702A-702K and data flows 704 between nodes 702A-702K. Data flows of different flow types may be presented in different colors, such as according to the color specified by the list of flow types in network template 18, which is represented in FIG. 7A as different patterns of dashed and dotted lines.

Information pane 701 may present various information regarding complex joint network 4. In the example of FIG. 7A, information pane 701 may present information regarding the network health of complex joint network 4. For example, information pane 701 may present information such as the network health, the network utility, the number of failed utility, the number of accepted utility, the number of failed flows, the number of accepted flows, and the maximum amount of bandwidth in complex joint network 4.

Figure 7B:
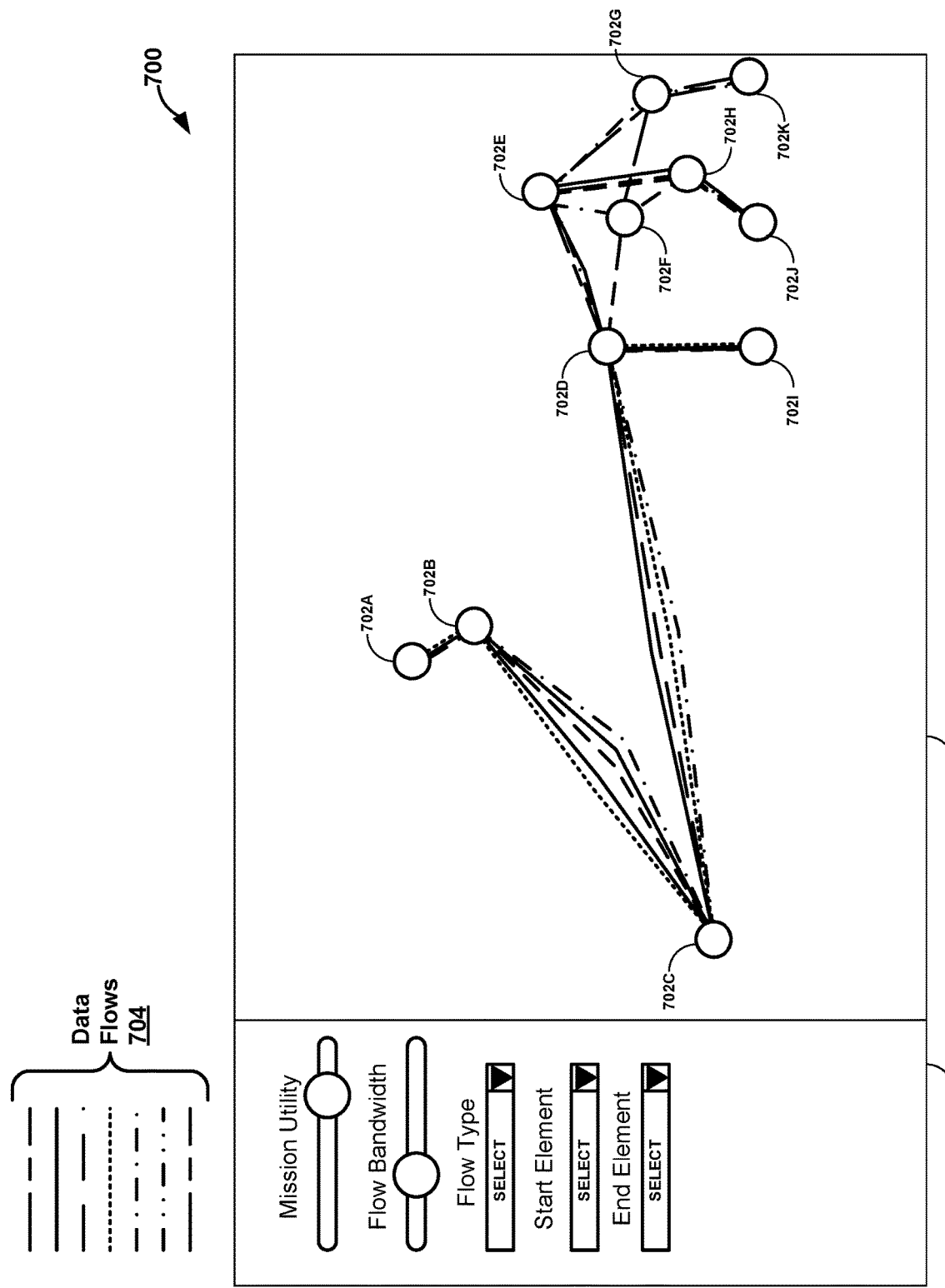

In some examples, users may interact with GUI 700 to customize the visualization of complex joint network 4 presented in visualization pane 703. As shown in FIG. 7B, information pane 701 may include widgets with which users may interact via user input to filter the flows presented in GUI 700 based on filtering criteria such as mission utility, flow bandwidth, flow type, source mission element, and destination mission element. In response to the user interacting with such widgets in information pane 701, network management system 20 may filter the flows of complex joint network 4 based on the filtering criteria and update visualization pane 703 to present flows meeting the filtering criteria and to refrain from presenting flows that do not meet the filtering criteria.

Figure 7C:
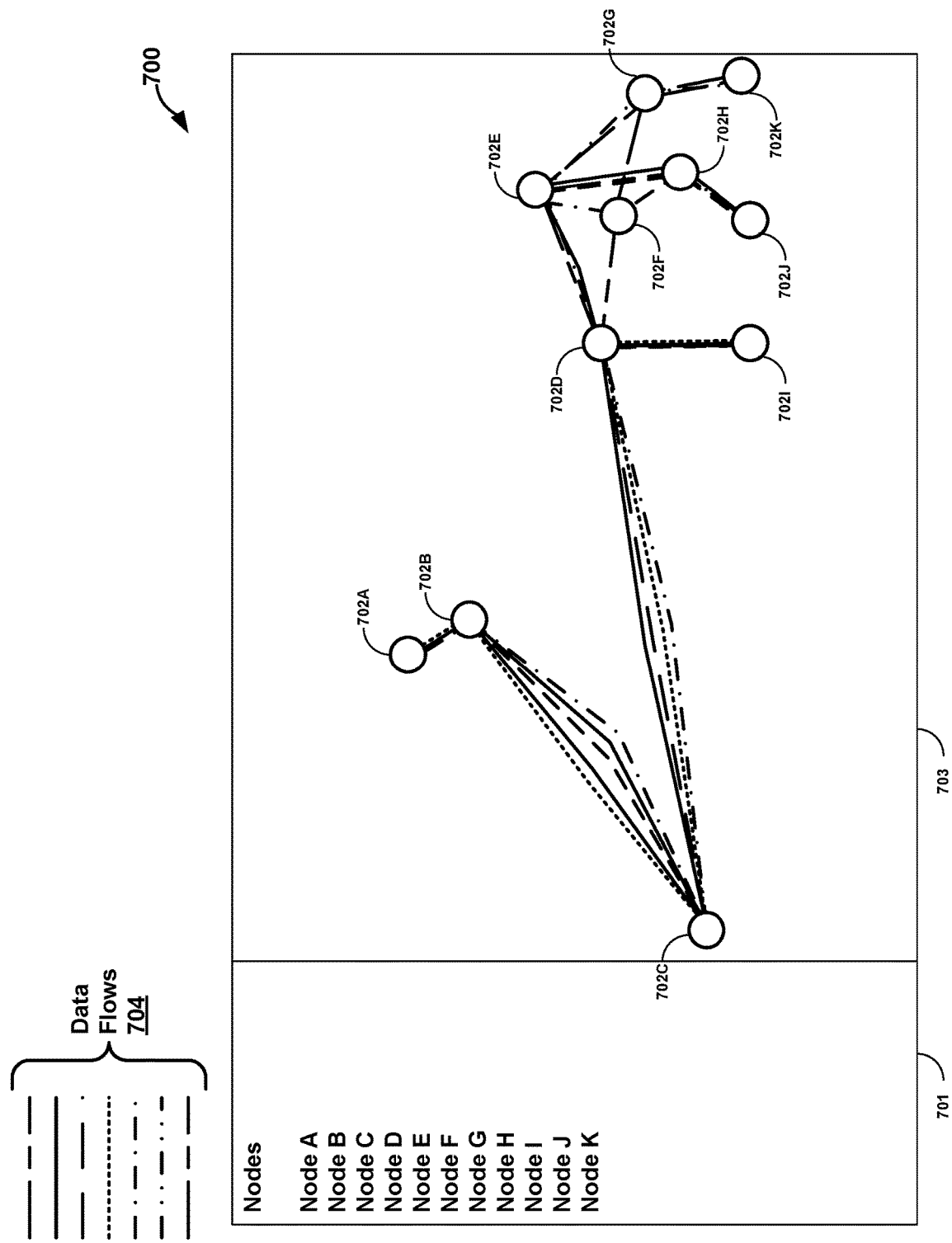
Figure 7D:
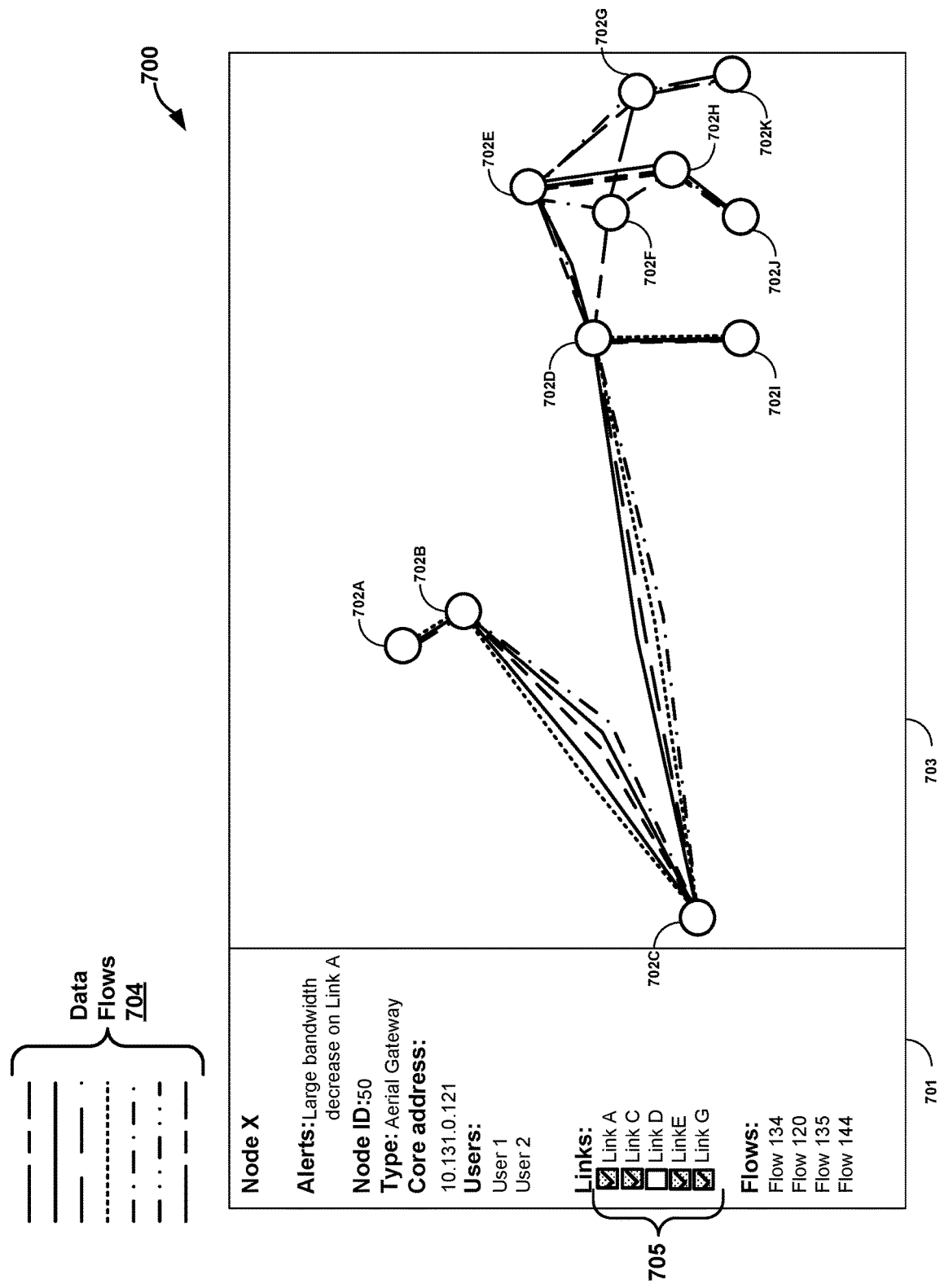

In some examples, GUI 700 may present information associated with nodes in complex joint network 4. As shown in FIG. 7C, information pane 701 may present a list of the nodes that are in complex joint network 4. In some examples, GUI 700 may present detailed information regarding specific nodes in complex joint network 4. As shown in FIG. 7D, information pane 701 may present information regarding a specific node in complex joint network 4. For example, information pane 701 may, for a node, present information such as alerts associated with the node, the node ID of the node, the node type, the core network address of the node, the users associated with the node, the network links connected to the node, and the flows admitted by the node. In some examples, GUI 700 may enable users to turn on and off the network links connected to the node. For example, the information regarding the network links connected to the node as presented in information pane 701 may include widgets 705 (FIG. 7D) associated with the network link with which a user may interact, such as by providing user input to select or unselect widgets 705 associated with the network links to turn on or off individual network links connected to the node.

In some examples, GUI 700 may, for a link, include one or more widgets with which a user may interact in order to perform beam steering for the node. For example the node may have a beam steering plug-in that communicates the positions of neighboring nodes found by the node along with the relative angles of the neighboring nodes.

Figure 7E:
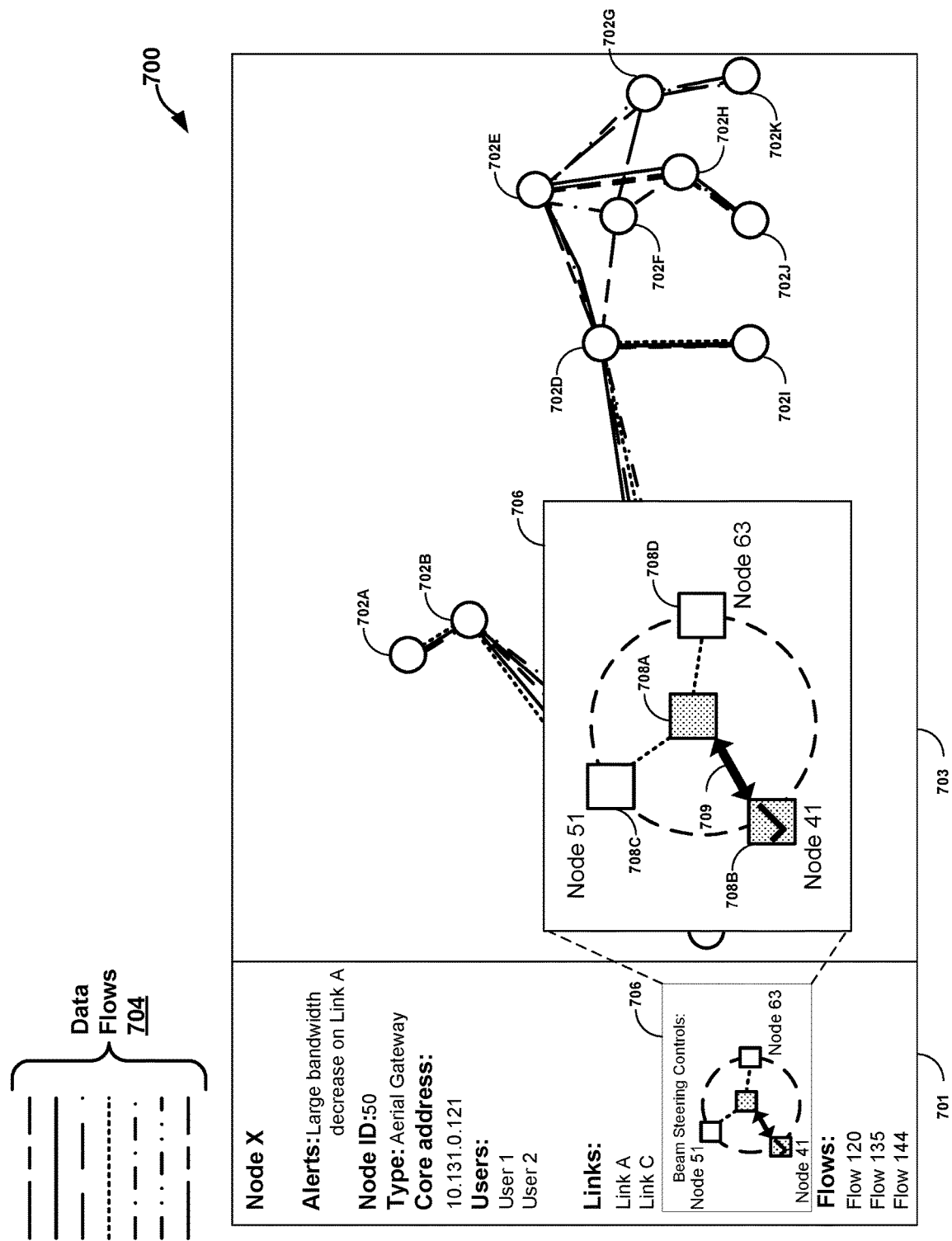

As shown in FIG. 7E, GUI 700 may include beam steering widget 706 that, for a node, presents a graphical representation of the node and neighboring nodes, the relative angles of the neighboring node with respect to the node, and the radio connection, if any, between the node and a neighboring node. For example, beam steering widget 706 presents the current node as node 708A and the neighboring nodes to node 708A as nodes 708B-708D, where nodes 708A-708D may correspond to a subset of nodes 702, and where beam steering widget 706 presents the relative angles between node 708A and each of the nodes 708B-708D. Further, beam steering widget 706 presents a graphical indicator 709 of node 708A being connected via radio to node 708B.

A user may interact with beam steering widget 706 to direct node 708A from being connected to node 708B to connect to node 708C or node 708D. For example, a user may provide user input to interact with the graphical representation of node 708B to unselect node 708B, thereby directing node 708A to cease communicating with node 708B. The user may also provide user input to interact with the graphical representation of node 708C to select node 708C, thereby directing node 708A to establish radio communications with node 708C.

Network management system 20 may receive the user input directing node 708A to cease communicating with node 708B and to establish radio communications with node 708C and may, in response, communicate with a router in complex joint network 4 that corresponds to node 708A to send instructions to the router to perform beam steering to cease communicating with the router in complex joint network 4 that corresponds to node 708B and to establish radio communications with the router in complex joint network 4 that corresponds to node 708C. In this way, network management system 20 may present GUI 700 that provides beam steering functionality that may be controlled by the user.

Figure 7F:
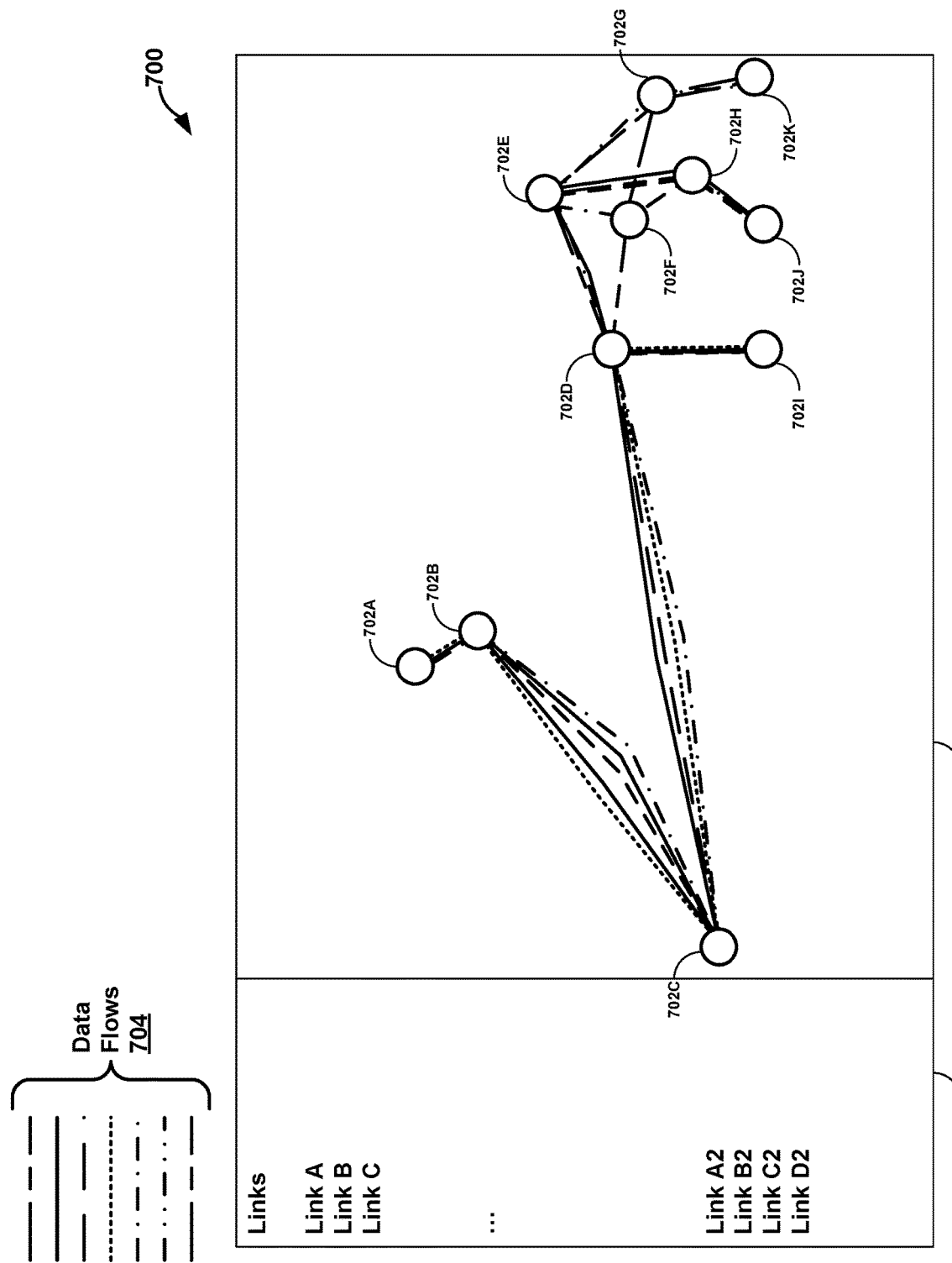
Figure 7G:
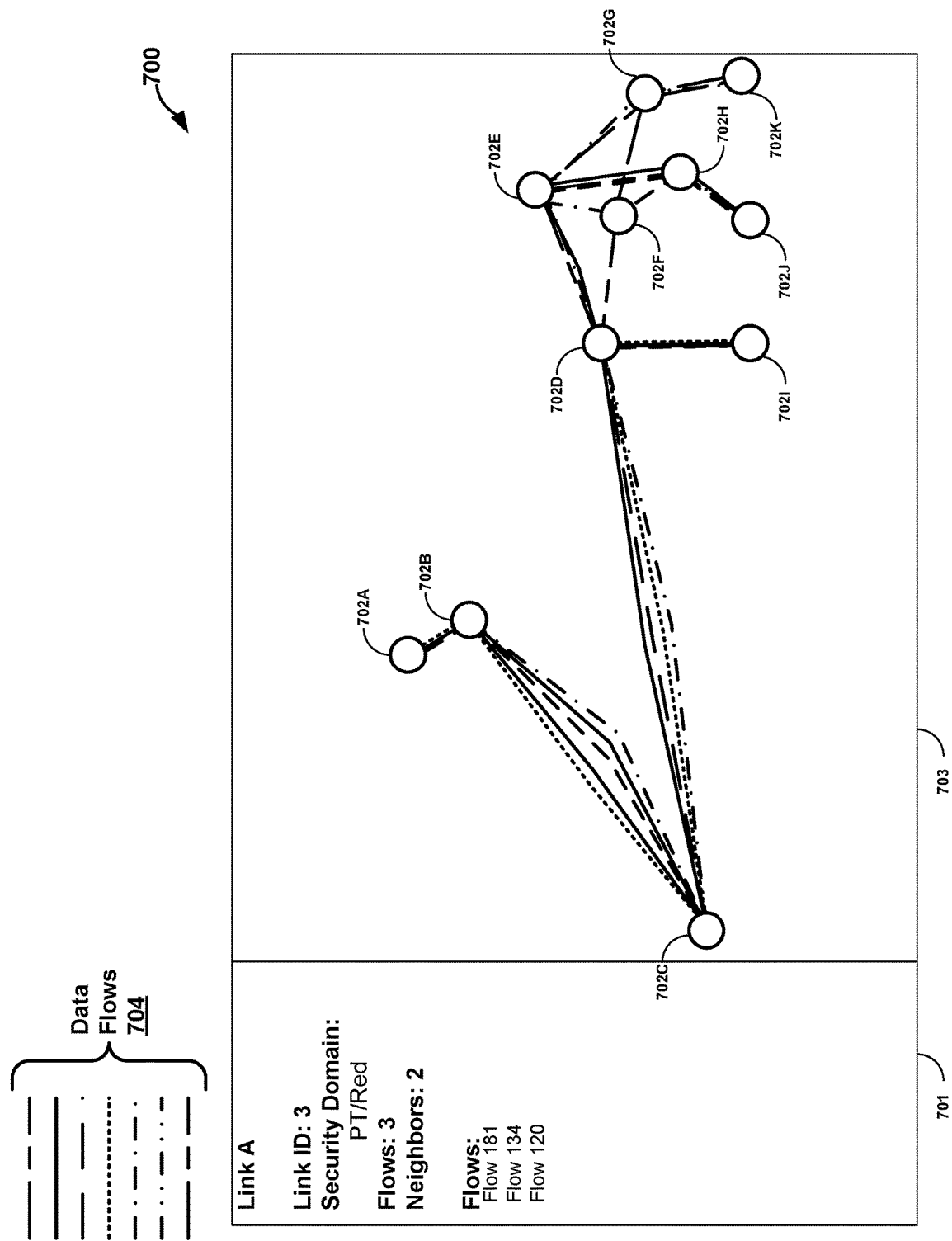

In some examples, GUI 700 may present information associated with network links in complex joint network 4. As shown in FIG. 7F, information pane 701 may present a list of the network links that are in complex joint network 4. In some examples, GUI 700 may present detailed information regarding specific network links in complex joint network 4. As shown in FIG. 7G, information pane 701 may present information regarding a specific network link in complex joint network 4. For example, information pane 701 may, for a network link, present information such as the link ID, the security domain of the link, the number of flows being carried by the network link, the number of neighbors to the network link, and names of the flows being carried by the network link.

Figure 7H:
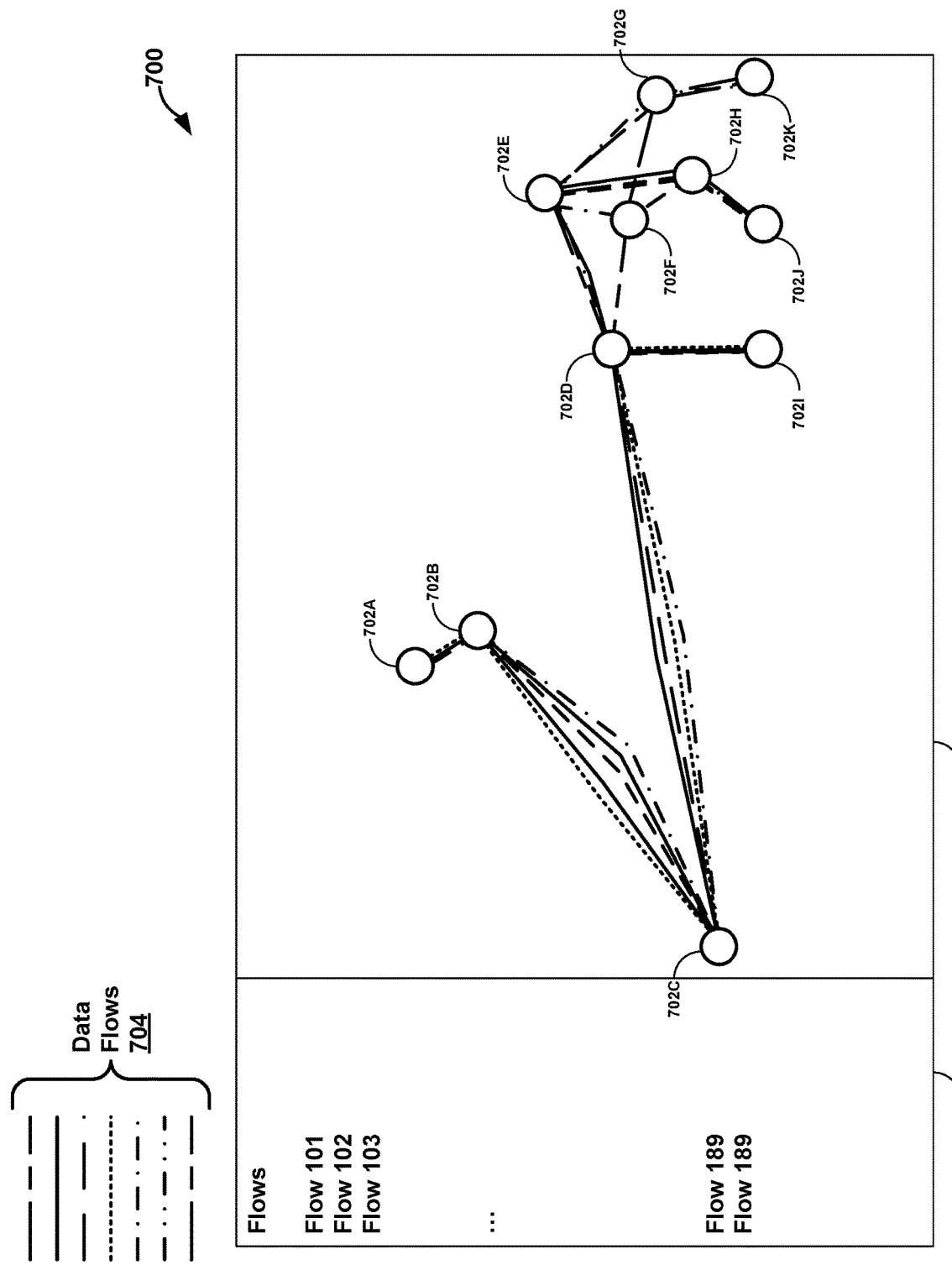
Figure 7I:
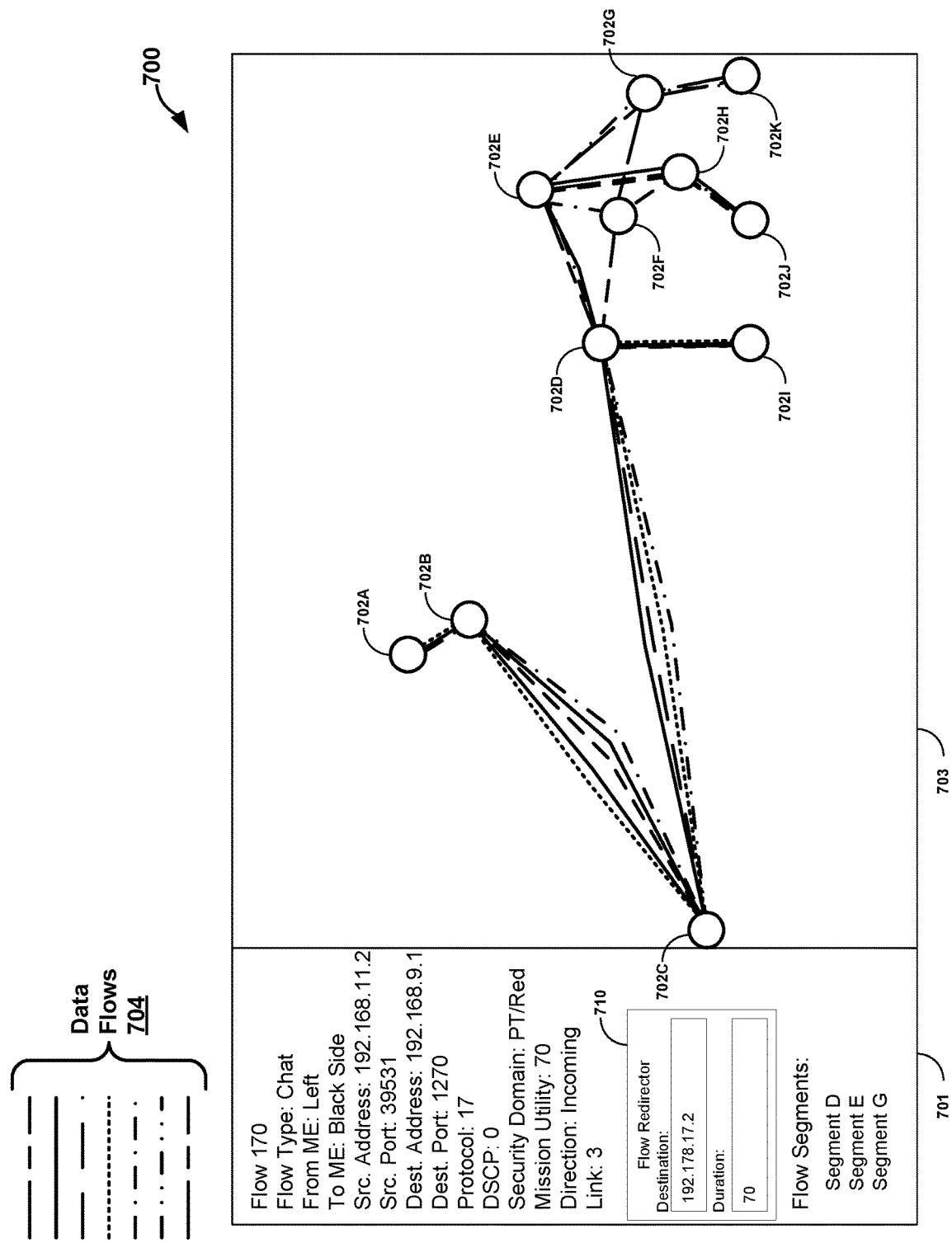

In some examples, GUI 700 may present information associated with data flows in complex joint network 4. As shown in FIG. 7H, information pane 701 may present a list of the data flows that are in complex joint network 4. In some examples, GUI 700 may present detailed information regarding specific data flows in complex joint network 4. As shown in FIG. 7I, information pane 701 may present information regarding a specific data flow in complex joint network 4. For example, information pane 701 may, for a data flow, present information such as the flow type, the source mission element of the data flow, the destination mission element of the data flow, the source network address of the data flow, the source port of the data flow, the destination network address of the data flow, the destination port of the data flow, the transport protocol of the data flow, the Differentiated Services Code Point (DSCP) of the data flow, the security domain of the data flow, the mission utility of the data flow, the flow direction of the data flow, the network link over which the data flow travels, and the network segments over which the data flow travels.

In some examples, information pane 701 may, for a specific flow, present flow redirector widget 710 with which a user can interact that causes network management system 20 to redirect a data flow to the destination network address inputted by the user into flow redirector widget 710 for the duration inputted by the user into flow redirector widget 710. To redirect a data flow, network management system 20 may perform mission responsive network control. For example, given a data flow from node 702C to a client device at node 702A, a user may send a request to network management system 20 to redirect the data flow to a client device at node 702I by providing user input, at flow director widget 710, that corresponds to a destination network address associated with the client device at node 702I.

Network management system 20 may, in response to receiving the request to redirect the data flow to the client device at node 702I, determine whether the network topology of complex joint network 4 has sufficient capacity to deliver the data flow from node 702A to the client device at node 702I. If network management system 20 determines that the network topology of complex joint network 4 does not have sufficient capacity to deliver the data flow from node 702A to the client device at node 702I, network management system 20 may configure nodes 702 to increase the capacity of paths between node 702A and node 702I in order to deliver the data flow from node 702A to the client device at node 702I.

In some examples, a user may provide user input to interact with the graphical representation of the nodes, flows, and the like of complex joint network 4 in visualization pane 703 of GUI 700 to cause network management system 20 to reconfigure complex joint network 4 to increase the capacity of paths between node 702A and node 702I in order to deliver the data flow from node 702A to the client device at node 702I. For example, visualization pane 703 may indicate that node 702C connects to node 702A via radio transmissions, and that switching the radio transmissions of node 702C to connect to node 702I may provide sufficient capacity to deliver the data flow from node 702A to the client device at node 702I.

The user may therefore provide user input to interact with the graphical representation of the nodes, flows, and the like of complex joint network 4 in visualization pane 703 to switch the radio transmissions of node 702C to connect to node 702I. For example, the user may provide a user input that correspond to a drag to drag a graphical representation of the radio connection between node 702C and node 702A so that the graphical representation of the radio connection links node 702C and node 702I.

Network management system 20 may, in response to receiving the user input that corresponds to switching the radio transmissions of node 702C to connect to node 702I, communicate with and send commands to nodes 702 in complex joint network 4 to switch the radio transmissions of node 702C to connect to node 702I. In some examples, network management system 20 may send a command to node 702A to turn off its radio to stop receiving the radio transmissions from node 702C and may send a command to node 702I to turn on its radio to start receiving the radio transmissions from node 702C. Node 702C may therefore discover the radio at node 702I and may lock a radio beam to the radio at node 702A. In some examples, network management system 20 may send a command to node 702C to direct node 702C to perform a beam switch to direct the radio beam tr towards the radio at node 702I.

Once the radio connection is established between node 702C and node 702I, network management system 20 may detect the change in the network topology of complex joint network 4 and may update the graphical representation of the nodes, flows, and the like of complex joint network 4 in visualization pane 703 based on the changes. Network management system 20 may also send to node 702C a command to send the data flow to the destination network address associated with the client device at node 702I. In this way, network management system 20 may redirect data flows in complex joint network 4.

Figure 7J:
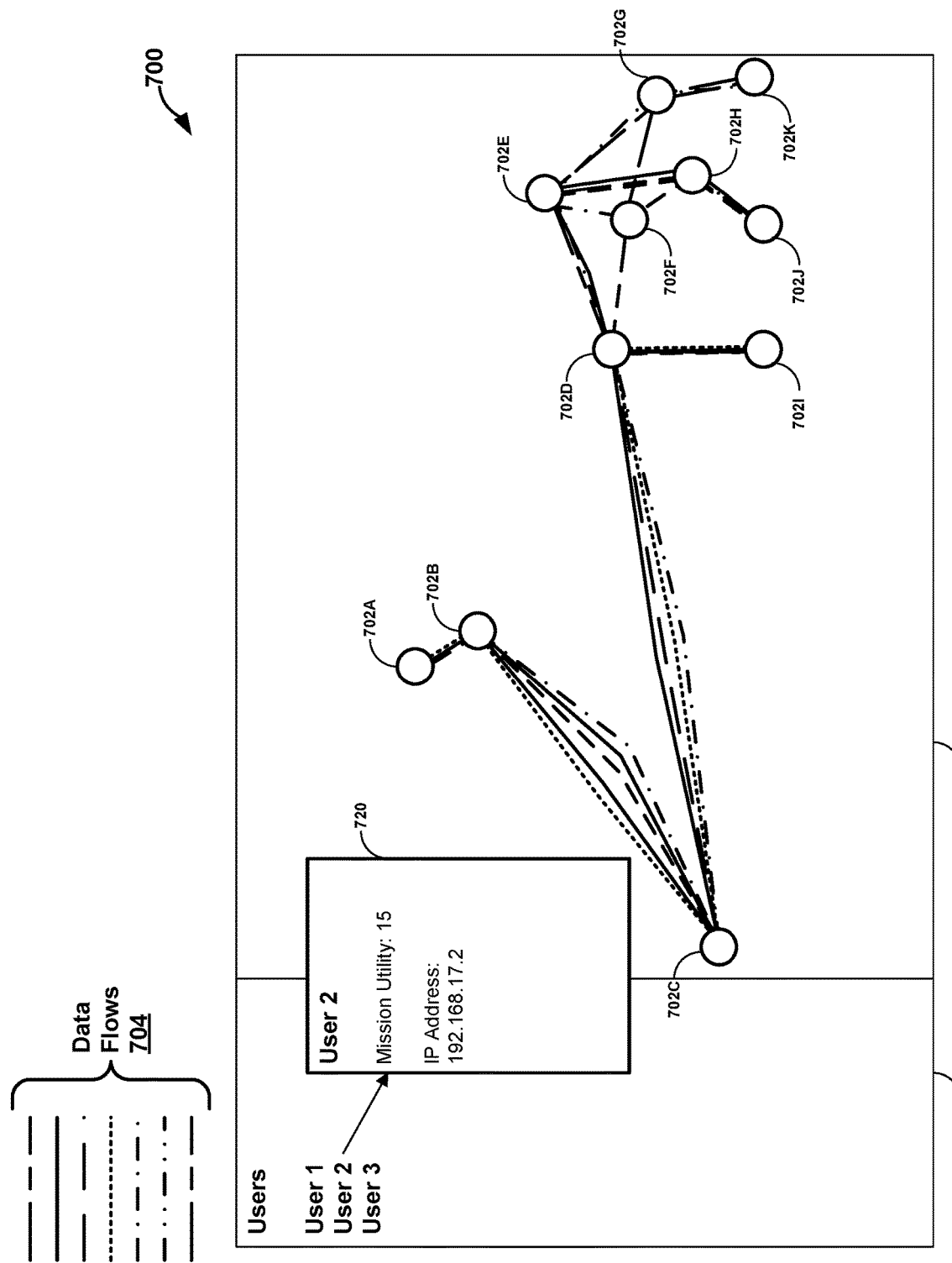

In some examples, GUI 700 may present information associated with users in complex joint network 4. As shown in FIG. 7J, information pane 701 may present a list of the users that are in complex joint network 4. In some examples, GUI 700 may present detailed information regarding specific nodes in complex joint network 4. For example, GUI 700 may, for a specific user, present user information in information pane 701 that presents information regarding a specific user, such as the mission utility associated with the user and the network address associated with the user.

Figure 8:
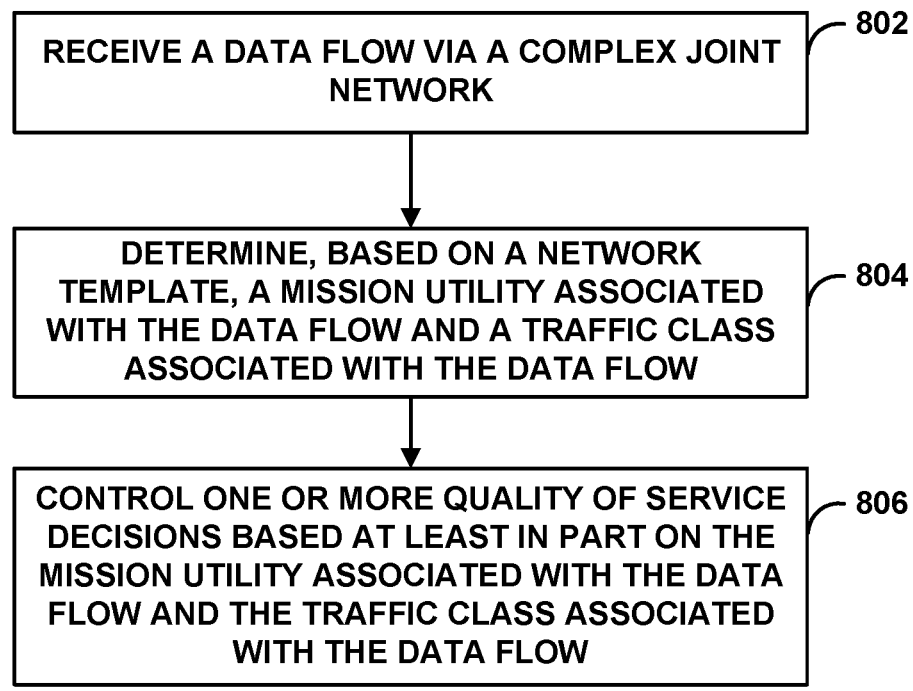
FIG. 8 is a flow diagram illustrating techniques for improving quality of service (e.g., flow admission control), in accordance with one or more techniques of this disclosure.

FIG. 8 is a flow diagram illustrating techniques for improving quality of service (e.g., flow admission control), in accordance with one or more techniques of this disclosure. The operations of FIG. 8 are described within the context of FIGS. 1A and 1B.

As shown in FIG. 8, one of the router devices of system 2, such as router device 10A, router device 11, or router device 14 may receive a data flow via a complex joint network 4 (802). Router device 10A, router device 11, or router device 14 may determine, based on a network template 18, a mission utility associated with the data flow and a traffic class associated with the data flow (804). Router device 10A, router device 11, or router device 14 may control one or more quality of service decisions, such as admission of the data flow, based at least in part on the mission utility associated with the data flow and the traffic class associated with the data flow (806).

In some examples, to determine the traffic class associated with the data flow, router device 10A, router device 11, or router device 14 may determine, based on at least one of: a source port associated with the data flow and a destination port associated with the data flow, the traffic class associated with the data flow out of a plurality of traffic classes specified by the network template 18.

In some examples, to control the admission of the data flow, router device 10A, router device 11, or router device 14 may determine, based on the network template 18, a bandwidth of a network link allocated for the traffic class associated with the data flow and determine whether to admit the data flow based at least in part on the mission utility associated with the data flow and the bandwidth allocated for the traffic class.

In some examples, determine whether to admit the data flow based at least in part on the mission utility associated with the data flow and the bandwidth allocated for the traffic class, router device 10A, router device 11, or router device 14 may determine, based on a flow type associated with the data flow, an expected bandwidth usage of the data flow, determine whether dropping one or more data flows of the traffic class that are associated with a lower mission utility than the mission utility associated with the data flow would create available bandwidth in the bandwidth in the network link allocated for the traffic class that is greater than or equal to the expected bandwidth usage of the data flow, in response to determining that dropping the one or more data flows would create the available bandwidth that is greater than or equal to the expected bandwidth usage of the data flow, drop the one or more data flows, and admit the data flow for transmission using the available bandwidth in the bandwidth in the network link allocated for the traffic class.

In some examples, to determine whether to admit the data flow based at least in part on the mission utility associated with the data flow and the bandwidth allocated for the traffic class, router device 10A, router device 11, or router device 14 may determine, based on a flow type associated with the data flow, an expected bandwidth usage of the data flow, determine whether moving one or more data flows of the traffic class that are associated with an equal or higher mission utility than the mission utility associated with the data flow to a second network link would create available bandwidth in the bandwidth in the network link allocated for the traffic class that is greater than or equal to the expected bandwidth usage of the data flow, in response to determining that moving the one or more data flows to the second link would create the available bandwidth in the network link that is greater than or equal to the expected bandwidth usage of the data flow, move the one or more data flows to the second network link, and admit the data flow for transmission using the available bandwidth in the bandwidth in the network link allocated for the traffic class.

In some examples, to determine, based on the network template 18, the mission utility associated with the data flow and the traffic class associated with the data flow, router device 10A, router device 11, or router device 14 may determine, based on at least one of: a source port associated with the data flow or a destination port associated with the data flow, a flow type associated with the data flow out of a plurality of flow types specified by the network template 18, determine a flow type mission utility associated with the data flow based at least in part on the determined flow type associated with the data flow, and determine the mission utility associated with the data flow based at least in part on the flow type mission utility associated with the data flow.

In some examples, to determine the flow type associated with the data flow, router device 10A, router device 11, or router device 14 may determine, based on the source port associated with the data flow, a source flow type associated with the data flow out of the plurality of flow types specified by the network template 18, determine a source flow type mission utility associated with the data flow based at least in part on the determined source flow type associated with the data flow, determine, based on the destination port associated with the data flow, a destination flow type associated with the data flow out of the plurality of flow types specified by the network template 18, and determine a destination flow type mission utility associated with the data flow based at least in part on the determined destination flow type associated with the data flow; In some examples, to determine the flow type mission utility associated with the data flow, router device 10A may determine the flow type mission utility associated with the data flow as the greater of the source flow type mission utility associated with the data flow and the destination flow type mission utility associated with the data flow.

In some examples, router device 10A, router device 11, or router device 14 may determine, based on at least one of: a source network address associated with the data flow or the destination network address associated with the data flow, a mission element associated with the data flow out of a plurality of mission elements specified by the network template 18, determine a mission element utility associated with the data flow based at least in part on the determined mission element associated with the data flow, and determine the mission utility associated with the data flow based at least in part on the flow type mission utility associated with the data flow and the mission element utility associated with the data flow.

In some examples, to determine the mission element associated with the data flow, router device 10A, router device 11, or router device 14 may determine, based on the source network address associated with the data flow, a source mission element associated with the data flow out of the plurality of mission elements specified by the network template 18, determine a source mission element utility associated with the data flow based at least in part on the determined source mission element associated with the data flow, determine, based on the destination network address associated with the data flow, a destination mission element associated with the data flow out of the plurality of mission elements specified by the network template 18, and determine a destination mission element utility associated with the data flow based at least in part on the determined destination mission element associated with the data flow. In some examples, to determine the mission element utility associated with the data flow, router device 10A, router device 11, or router device 14 may determine the mission element utility associated with the data flow as the greater of the source mission element utility associated with the data flow and the destination mission element utility associated with the data flow.

In some examples, to determine the mission utility associated with the data flow based at least in part on the flow type mission utility associated with the data flow and the mission element utility associated with the data flow, router device 10A, router device 11, or router device 14 may determine the mission utility associated with the data flow as a sum of the flow type mission utility associated with the data flow and the mission element utility associated with the data flow.

In some examples, router device 10A, router device 11, or router device 14 may receive, from network management system 20, an instruction to perform beam steering to establish wireless communications with a first neighboring node. Router device 10A, router device 11, or router device 14 may, in response to receiving the instruction, perform beam steering to disconnect wireless communications with a second neighboring node and to establish wireless communications with the first neighboring node.

In some example, network management system 20 may output a graphical user interface (GUI) 700 that includes a beam steering widget, wherein the beam steering widget presents a view of a node that corresponds to router device 10A, router device 11, or router device 14, a view of relative angles of neighboring nodes with respect to the node, and a view of a radio connection between the node and the second node. Network management system 20 may receive a first user input for directing the node to perform beam steering to establish wireless communications with the first neighboring node. Network management system 20 may, in response to receiving the first user input, send, to router device 10A, router device 11, or router device 14, the instruction to establish wireless communications with the first neighboring node.

In some examples, to determine the mission utility associated with the data flow and the traffic class associated with the data flow, router device 10A or router device 14 may receive a tag associated with the data flow that specifies the mission utility associated with the data flow and the traffic class, where the complex joint network is a crypto-partitioned network and where router device 10A or router device 14 is in an encrypted portion of the crypto-partitioned network.

In some examples, network management system 20 may determine unused bandwidth in one or more links of the complex joint network 4. Network management system 20 may perform sets of simulated changes to the complex joint network 4 to utilize the unused bandwidth. Network management system 20 may determine a set of simulated changes to the complex joint network 4 having the greatest Normalized Cumulative Network Performance (CNP) out of the sets of simulated changes to the complex joint network 4. Network management system 20 may send a plurality of commands to nodes of the complex joint network 4 to make the set of simulated changes to the complex joint network 4. router device 10A, router device 11, or router device 14 may receive one or more commands out of the plurality of commands. Router device 10A, router device 11, or router device 14 may perform the one or more commands, wherein the one or more commands include one or more of: one or more commands to enable a first one or more links, one or more commands to disable a second one or more links, one or more commands to perform beam steering, one or more commands to redirect a particular data flow, one or more commands to update performance of mission-aware routing by router device 10A, router device 11, or router device 14, and one or more commands to update performance of traffic-aware routing by router device 10A, router device 11, or router device 14.

In some examples, network management system 20 may output a graphical user interface (GUI) 700 that provides a view of nodes of the complex joint network 4, a view of links between the nodes of the complex joint network 4, and a view of data flows of the complex joint network 4. Network management system 20 may receive one or more filtering parameters, wherein the one or more filtering parameters specify one or more of: a mission utility, a flow bandwidth, a flow type, a start mission element, or an end mission element. Network management system 20 may, in response to receiving the one or more filtering parameters, update the GUI 700 to provide a view of a subset of the data flows of the complex joint network 4 that matches the one or more filtering parameters.

In some examples, network management system 20 may receive user input that corresponds to a specified data flow that is to be redirected to a specified destination. Network management system 20 may, in response to receiving the user input, send, to one or more nodes in the complex joint network 4, one or more instructions to redirect the specified data flow to the specified destination.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and radio, then the coaxial cable, fiber optic cable, twisted pair, DSL, or wireless technologies such as infrared, radio, and radio are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:
   receiving, by a computing device, a network template used by each of a plurality of computing devices of a complex joint network to control quality of service decisions, wherein the network template specifies a plurality of traffic classes associated with a plurality of ports;
   receiving, by the computing device, a data flow via the complex joint network;
   determining, by the computing device and based on the network template, a mission utility associated with the data flow and a traffic class associated with the data flow, including comparing at least one of a source port associated with the data flow or a destination port associated with the data flow with one or more of the plurality of ports associated with the plurality of traffic classes specified by the network template to determine the traffic class associated with the data flow;

controlling, by the computing device, one or more quality of service decisions based at least in part on the mission utility associated with the data flow and the traffic class associated with the data flow;

determining, by a network management system, unused bandwidth in one or more links of the complex joint network;

performing, by the network management system, sets of simulated changes to the complex joint network to utilize the unused bandwidth;

determining, by the network management system, a set of simulated changes to the complex joint network having the greatest Normalized Cumulative Network Performance (CNP) out of the sets of simulated changes to the complex joint network;

sending, by the network management system, a plurality of commands to nodes of the complex joint network to make the set of simulated changes to the complex joint network;

receiving, by the computing device, one or more commands out of the plurality of commands; and performing, by the computing device, the one or more commands, wherein the one or more commands include one or more of: one or more commands to enable a first one or more links, one or more commands to disable a second one or more links, one or more commands to perform beam steering, one or more commands to redirect a particular data flow, one or more commands to update performance of mission-aware routing by the computing device, and one or more commands to update performance of traffic-aware routing by the computing device.

2. The method of claim 1, wherein controlling the one or more quality of service decisions further comprises:

determining, by the computing device and based on the network template, a bandwidth of a network link allocated for the traffic class associated with the data flow; and determining, by the computing device, whether to admit the data flow based at least in part on the mission utility associated with the data flow and the bandwidth allocated for the traffic class.

3. The method of claim 2, wherein determining whether to admit the data flow based at least in part on the mission utility associated with the data flow and the bandwidth allocated for the traffic class further comprises:

determining, by the computing device and based on a flow type associated with the data flow, an expected bandwidth usage of the data flow;

determining, by the computing device, whether dropping one or more data flows of the traffic class that are associated with a lower mission utility than the mission utility associated with the data flow would create available bandwidth in the bandwidth in the network link allocated for the traffic class that is greater than or equal to the expected bandwidth usage of the data flow;

in response to determining that dropping the one or more data flows would create the available bandwidth that is greater than or equal to the expected bandwidth usage of the data flow, dropping, by the computing device, the one or more data flows; and admitting, by the computing device, the data flow for transmission using the available bandwidth in the bandwidth in the network link allocated for the traffic class.

4. The method of claim 2, wherein determining whether to admit the data flow based at least in part on the mission utility associated with the data flow and the bandwidth allocated for the traffic class further comprises:

determining, by the computing device and based on a flow type associated with the data flow, an expected bandwidth usage of the data flow;

determining, by the computing device, whether moving one or more data flows of the traffic class that are associated with an equal or higher mission utility than the mission utility associated with the data flow to a second network link would create available bandwidth in the bandwidth in the network link allocated for the traffic class that is greater than or equal to the expected bandwidth usage of the data flow;

in response to determining that moving the one or more data flows to the second network link would create the available bandwidth in the network link that is greater than or equal to the expected bandwidth usage of the data flow, moving, by the computing device, the one or more data flows to the second network link; and admitting, by the computing device, the data flow for transmission using the available bandwidth in the bandwidth in the network link allocated for the traffic class.

5. The method of claim 1, wherein determining, based on the network template, the mission utility associated with the data flow and the traffic class associated with the data flow further comprises:

determining, by the computing device and based on at least one of a source port associated with the data flow or a destination port associated with the data flow, a flow type associated with the data flow out of a plurality of flow types specified by the network template;

determining, by the computing device, a flow type mission utility associated with the data flow based at least in part on the determined flow type associated with the data flow; and determining, by the computing device, the mission utility associated with the data flow based at least in part on the flow type mission utility associated with the data flow.

6. The method of claim 5, wherein determining the flow type associated with the data flow further comprises:

determining, by the computing device and based on the source port associated with the data flow, a source flow type associated with the data flow out of the plurality of flow types specified by the network template;

determining, by the computing device, a source flow type mission utility associated with the data flow based at least in part on the determined source flow type associated with the data flow;

determining, by the computing device and based on the destination port associated with the data flow, a destination flow type associated with the data flow out of the plurality of flow types specified by the network template; and determining, by the computing device, a destination flow type mission utility associated with the data flow based at least in part on the determined destination flow type associated with the data flow; and wherein determining the flow type mission utility associated with the data flow further comprises determining, by the computing device, the flow type mission utility associated with the data flow as the greater of the source flow type mission utility associated with the data flow and the destination flow type mission utility associated with the data flow.

7. The method of claim 6, further comprising:
- determining, by the computing device and based on at least one of: a source network address associated with the data flow or a destination network address associated with the data flow, a mission element associated with the data flow out of a plurality of mission elements specified by the network template;
- determining, by the computing device, a mission element utility associated with the data flow based at least in part on the determined mission element associated with the data flow; and
- determining, by the computing device, the mission utility associated with the data flow based at least in part on the flow type mission utility associated with the data flow and the mission element utility associated with the data flow.

8. The method of claim 7, wherein determining the mission element associated with the data flow further comprises:
- determining, by the computing device and based on the source network address associated with the data flow, a source mission element associated with the data flow out of the plurality of mission elements specified by the network template;
- determining, by the computing device, a source mission element utility associated with the data flow based at least in part on the determined source mission element associated with the data flow;
- determining, by the computing device and based on a destination network address associated with the data flow, a destination mission element associated with the data flow out of the plurality of mission elements specified by the network template;
- determining, by the computing device, a destination mission element utility associated with the data flow based at least in part on the determined destination mission element associated with the data flow; and
- wherein determining the mission element utility associated with the data flow further comprises determining, by the computing device, the mission element utility associated with the data flow as the greater of the source mission element utility associated with the data flow and the destination mission element utility associated with the data flow.

9. The method of claim 8, wherein determining the mission utility associated with the data flow based at least in part on the flow type mission utility associated with the data flow and the mission element utility associated with the data flow further comprises:
- determining, by the computing device, the mission utility associated with the data flow as a sum of the flow type mission utility associated with the data flow and the mission element utility associated with the data flow.

10. The method of claim 1, further comprising:
- receiving, by the computing device from a network management system, an instruction to perform beam steering to establish wireless communications with a first neighboring node; and
- in response to receiving the instruction, perform beam steering to disconnect wireless communications with a second neighboring node and to establish wireless communications with the first neighboring node.

11. The method of claim 10, further comprising:
- outputting, by the network management system, a graphical user interface (GUI) that includes a beam steering widget, wherein the beam steering widget presents a view of a node that corresponds to the computing device, a view of relative angles of neighboring nodes with respect to the node, and a view of a radio connection between the node and the second node;
- receiving, by the network management system, a first user input for directing the node to perform beam steering to establish wireless communications with the first neighboring node; and
- in response to receiving the first user input, sending, by the network management system to the computing device, the instruction to establish wireless communications with the first neighboring node.

12. The method of claim 1, wherein determining the mission utility associated with the data flow and the traffic class associated with the data flow comprises:
- receiving, by the computing device, a tag associated with the data flow that specifies the mission utility associated with the data flow and the traffic class, wherein the complex joint network is a crypto-partitioned network and wherein the computing device is in an encrypted portion of the crypto-partitioned network.

13. The method of claim 1, further comprising:
- outputting, by a network management system, a graphical user interface (GUI) that provides a view of nodes of the complex joint network, a view of links between the nodes of the complex joint network, and a view of data flows of the complex joint network;
- receiving, by the network management system, one or more filtering parameters, wherein the one or more filtering parameters specify one or more of: a mission utility, a flow bandwidth, a flow type, a start mission element, or an end mission element; and
- in response to receiving the one or more filtering parameters, updating, by the network management system, the GUI to provide a view of a subset of the data flows of the complex joint network that matches the one or more filtering parameters.

14. The method of claim 13, further comprising:
- receiving, by the network management system, user input that corresponds to a specified data flow that is to be redirected to a specified destination; and
- in response to receiving the user input, sending, by the network management system to one or more nodes in the complex joint network, one or more instructions to redirect the specified data flow to the specified destination.

15. A computing device comprising:
memory;
one or more processors operably coupled to the memory and configured to:
- receive a network template used by each of a plurality of computing devices of a complex joint network to control quality of service decisions, wherein the network template specifies a plurality of traffic classes associated with a plurality of ports;
- receive a data flow via the complex joint network;
- determine, based on the network template, a mission utility associated with the data flow and a traffic class associated with the data flow, including comparing at least one of a source port associated with the data flow or a destination port associated with the data flow with one or more of the plurality of ports associated with the plurality of traffic classes specified by the network template to determine the traffic class associated with the data flow;
- control one or more quality of service decisions of the data flow based at least in part on the mission utility associated with the data flow and the traffic class associated with the data flow;

receive one or more commands out of a plurality of commands sent by a network management system to a plurality of commands to nodes, including the computing device, of the complex joint network to make a set of simulated changes to the complex joint network determined by the network management system as having the greatest Normalized Cumulative Network Performance (CNP) out of sets of simulated changes to the complex joint network performed by the network management system to utilize unused bandwidth in one or more links of the complex joint network determined by the network management system; and perform the one or more commands, wherein the one or more commands include one or more of: one or more commands to enable a first one or more links, one or more commands to disable a second one or more links, one or more commands to perform beam steering, one or more commands to redirect a particular data flow, one or more commands to update performance of mission-aware routing by the computing device, and one or more commands to update performance of traffic-aware routing by the computing device.

16. The computing device of claim 15, wherein to control the one or more quality of service decisions of the data flow, the one or more processors are further configured to:
determine, based on the network template, a bandwidth of a network link allocated for the traffic class associated with the data flow; and
determine whether to admit the data flow based at least in part on the mission utility associated with the data flow and the bandwidth allocated for the traffic class.

17. The computing device of claim 16, wherein to determine whether to admit the data flow based at least in part on the mission utility associated with the data flow and the bandwidth allocated for the traffic class, the one or more processors are further configured to:
determine, based on a flow type associated with the data flow, an expected bandwidth usage of the data flow;
determine whether dropping one or more data flows of the traffic class that are associated with a lower mission utility than the mission utility associated with the data flow would create available bandwidth in the bandwidth in the network link allocated for the traffic class that is greater than or equal to the expected bandwidth usage of the data flow;
in response to determining that dropping the one or more data flows would create the available bandwidth that is greater than or equal to the expected bandwidth usage of the data flow, drop the one or more data flows; and
admit the data flow for transmission using the available bandwidth in the bandwidth in the network link allocated for the traffic class.

18. The computing device of claim 16, wherein to determine whether to admit the data flow based at least in part on the mission utility associated with the data flow and the bandwidth allocated for the traffic class, the one or more processors are further configured to:
determine, based on a flow type associated with the data flow, an expected bandwidth usage of the data flow;
determine whether moving one or more data flows of the traffic class that are associated with an equal or higher mission utility than the mission utility associated with the data flow to a second network link would create available bandwidth in the bandwidth in the network link allocated for the traffic class that is greater than or equal to the expected bandwidth usage of the data flow;
in response to determining that moving the one or more data flows to the second network link would create the available bandwidth in the network link that is greater than or equal to the expected bandwidth usage of the data flow, move the one or more data flows to the second network link; and
admit the data flow for transmission using the available bandwidth in the bandwidth in the network link allocated for the traffic class.

19. The computing device of claim 15, wherein to determine, based on the network template, the mission utility associated with the data flow and the traffic class associated with the data flow, the one or more processors are further configured to:
determine, based on at least one of a source port associated with the data flow or a destination port associated with the data flow, a flow type associated with the data flow out of a plurality of flow types specified by the network template;
determine a flow type mission utility associated with the data flow based at least in part on the determined flow type associated with the data flow; and
determine the mission utility associated with the data flow based at least in part on the flow type mission utility associated with the data flow.

20. The computing device of claim 19, wherein to determine the flow type associated with the data flow, the one or more processors are further configured to:
determine, based on the source port associated with the data flow, a source flow type associated with the data flow out of the plurality of flow types specified by the network template;
determine a source flow type mission utility associated with the data flow based at least in part on the determined source flow type associated with the data flow;
determine, based on the destination port associated with the data flow, a destination flow type associated with the data flow out of the plurality of flow types specified by the network template; and
determine a destination flow type mission utility associated with the data flow based at least in part on the determined destination flow type associated with the data flow; and
wherein to determine the flow type mission utility associated with the data flow, the one or more processors are further configured to determine the flow type mission utility associated with the data flow as the greater of the source flow type mission utility associated with the data flow and the destination flow type mission utility associated with the data flow.

21. The computing device of claim 20, wherein the one or more processors are further configured to:
determine, based on at least one of: a source network address associated with the data flow or a destination network address associated with the data flow, a mission element associated with the data flow out of a plurality of mission elements specified by the network template;
determine a mission element utility associated with the data flow based at least in part on the determined mission element associated with the data flow; and
determine the mission utility associated with the data flow based at least in part on the flow type mission utility associated with the data flow and the mission element utility associated with the data flow.

22. The computing device of claim 21, wherein to determine the mission element associated with the data flow, the one or more processors are further configured to:
- determine, based on the source network address associated with the data flow, a source mission element associated with the data flow out of the plurality of mission elements specified by the network template;
- determine a source mission element utility associated with the data flow based at least in part on the determined source mission element associated with the data flow;
- determine, based on a destination network address associated with the data flow, a destination mission element associated with the data flow out of the plurality of mission elements specified by the network template;
- determine a destination mission element utility associated with the data flow based at least in part on the determined destination mission element associated with the data flow; and
- wherein to determine the mission element utility associated with the data flow, the one or more processors are further configured to determine the mission element utility associated with the data flow as the greater of the source mission element utility associated with the data flow and the destination mission element utility associated with the data flow.

23. A computer-readable storage medium storing instructions that, when executed, cause one or more processors of a computing device to:
- receive a network template used by each of a plurality of computing devices of a complex joint network to control quality of service decisions, wherein the network template specifies a plurality of traffic classes associated with a plurality of ports;
- receive a data flow via the complex joint network;
- determine, based on the network template, a mission utility associated with the data flow and a traffic class associated with the data flow, including comparing at least one of a source port associated with the data flow or a destination port associated with the data flow with one or more of the plurality of ports associated with the plurality of traffic classes specified by the network template to determine the traffic class associated with the data flow;
- control one or more quality of service decisions of the data flow based at least in part on the mission utility associated with the data flow and the traffic class associated with the data flow;
- receive one or more commands out of a plurality of commands sent by a network management system to a plurality of commands to nodes, including the computing device, of the complex joint network to make a set of simulated changes to the complex joint network determined by the network management system as having the greatest Normalized Cumulative Network Performance (CNP) out of sets of simulated changes to the complex joint network performed by the network management system to utilize unused bandwidth in one or more links of the complex joint network determined by the network management system; and
- perform the one or more commands, wherein the one or more commands include one or more of: one or more commands to enable a first one or more links, one or more commands to disable a second one or more links, one or more commands to perform beam steering, one or more commands to redirect a particular data flow, one or more commands to update performance of mission-aware routing by the computing device, and one or more commands to update performance of traffic-aware routing by the computing device.

* * * * *